(12) United States Patent
Shen et al.

(10) Patent No.: US 12,276,164 B2
(45) Date of Patent: Apr. 15, 2025

(54) INERTIA DAMPING SYSTEMS AND METHODS

(71) Applicant: Schlumberger Technology Corporation, Sugar Land, TX (US)

(72) Inventors: Yuelin Shen, Spring, TX (US); Mauro Caresta, Cambridge (GB); Scott Richard Woolston, Spanish Fork, UT (US); Clint William Philbrick, Springville, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 120 days.

(21) Appl. No.: 17/907,551

(22) PCT Filed: Mar. 30, 2021

(86) PCT No.: PCT/US2021/024826
§ 371 (c)(1),
(2) Date: Sep. 28, 2022

(87) PCT Pub. No.: WO2021/202484
PCT Pub. Date: Oct. 7, 2021

(65) Prior Publication Data
US 2023/0142360 A1 May 11, 2023

Related U.S. Application Data

(60) Provisional application No. 63/022,825, filed on May 11, 2020, provisional application No. 63/002,039, filed on Mar. 30, 2020.

(51) Int. Cl.
*E21B 17/07* (2006.01)
*E21B 17/10* (2006.01)
(Continued)

(52) U.S. Cl.
CPC .............. *E21B 17/07* (2013.01); *E21B 17/10* (2013.01); *F16F 15/173* (2013.01); *E21B 17/073* (2013.01); *E21B 21/00* (2013.01)

(58) Field of Classification Search
CPC ........ E21B 17/07; E21B 17/10; E21B 17/073; E21B 21/00; F16F 15/173
See application file for complete search history.

(56) References Cited

U.S. PATENT DOCUMENTS

| | | |
|---|---|---|
| 2,953,351 A | 9/1960 | Bodine |
| 3,234,817 A | 2/1966 | Williamson |

(Continued)

FOREIGN PATENT DOCUMENTS

| | | |
|---|---|---|
| WO | 2007049968 A1 | 5/2007 |
| WO | 2021050334 A1 | 3/2021 |

(Continued)

OTHER PUBLICATIONS

International Search Report and Written Opinion issued in International Patent application PCT/2021/02486 on Jul. 16, 2021, 12 pages.

(Continued)

*Primary Examiner* — Robert E Fuller
*Assistant Examiner* — Neel Girish Patel
(74) *Attorney, Agent, or Firm* — Jeffrey D. Frantz

(57) ABSTRACT

A torsional damping system includes a housing having an interior space. An inertia ring is located in the interior space, and a torsion fluid is located between the inertia ring and the housing. The inertia ring is rotatably installed relative to the housing. As the housing oscillates, the inertia ring damps at least a portion of the oscillation. The torsional damping system may be included in a downhole tool or bottomhole assembly, and used to damp oscillations along a drill string (Continued)

or along the bottomhole assembly, including between a downhole motor and a cutting tool.

10 Claims, 14 Drawing Sheets

(51) Int. Cl.
 *E21B 21/00* (2006.01)
 *F16F 15/173* (2006.01)

(56) References Cited

U.S. PATENT DOCUMENTS

| | | | |
|---|---|---|---|
| 3,361,493 A * | 1/1968 | Melton | E21B 17/1064 |
| | | | 384/547 |
| 3,606,392 A | 9/1971 | Garrett | |
| 3,641,839 A | 2/1972 | Greeley | |
| 3,660,990 A | 5/1972 | Zerb | |
| 3,774,731 A | 11/1973 | Zerb | |
| 3,779,040 A | 12/1973 | Garrett | |
| 3,884,051 A * | 5/1975 | Bottoms | F16C 29/04 |
| | | | 175/321 |
| 3,992,963 A | 11/1976 | Khanna | |
| 4,133,516 A | 1/1979 | Jurgens | |
| 4,162,619 A | 7/1979 | Nixon, Jr. | |
| 4,173,130 A | 11/1979 | Sutliff et al. | |
| 4,262,553 A | 4/1981 | Bremer, Jr. | |
| 4,281,726 A | 8/1981 | Garrett | |
| 4,522,271 A | 6/1985 | Bodine et al. | |
| 4,901,806 A | 2/1990 | Forrest | |
| 5,479,996 A | 1/1996 | Jonsson et al. | |
| 5,947,211 A | 9/1999 | Jakobsson | |
| 6,364,039 B1 | 4/2002 | Majkovic | |
| 6,394,198 B1 | 5/2002 | Hall et al. | |
| 6,412,614 B1 | 7/2002 | Lagrange et al. | |
| 6,808,455 B1 | 10/2004 | Solorenko et al. | |
| 6,997,271 B2 | 2/2006 | Nichols et al. | |
| 7,036,612 B1 * | 5/2006 | Raymond | F16F 9/535 |
| | | | 175/320 |
| 7,082,821 B2 | 8/2006 | Chen et al. | |
| 7,216,726 B2 | 5/2007 | Swietlik et al. | |
| 7,219,752 B2 | 5/2007 | Wassell et al. | |
| 7,377,339 B2 | 5/2008 | Wassell et al. | |
| 7,578,360 B2 | 8/2009 | Haughom | |
| 7,654,344 B2 | 2/2010 | Haughom et al. | |
| 7,748,474 B2 | 7/2010 | Watkins et al. | |
| 7,971,662 B2 | 7/2011 | Beuershausen | |
| 7,997,357 B2 | 8/2011 | Wassell et al. | |
| 8,205,686 B2 | 6/2012 | Beuershausen | |
| 8,205,691 B2 | 6/2012 | Bowar et al. | |
| 8,240,401 B2 | 8/2012 | Wassell et al. | |
| 8,662,205 B2 | 3/2014 | Wassell et al. | |
| 8,944,190 B2 | 2/2015 | Wassell et al. | |
| 9,249,632 B2 | 2/2016 | Lakkashetti et al. | |
| 9,255,449 B2 | 2/2016 | Schwefe et al. | |
| 9,255,450 B2 | 2/2016 | Jain et al. | |
| 9,328,567 B2 | 5/2016 | Evans | |
| 9,376,874 B2 | 6/2016 | Reimers | |
| 9,458,679 B2 | 10/2016 | Turner et al. | |
| 9,476,261 B2 | 10/2016 | Venugopal et al. | |
| 9,657,523 B2 | 5/2017 | Oueslati et al. | |
| 9,784,046 B2 | 10/2017 | Gajji et al. | |
| 9,835,226 B2 | 12/2017 | Son | |
| 9,915,138 B2 | 3/2018 | Schwefe et al. | |
| 9,926,779 B2 | 3/2018 | Sugiura | |
| 10,001,005 B2 | 6/2018 | Schwefe et al. | |
| 10,047,573 B2 | 8/2018 | Kadam et al. | |
| 10,364,663 B2 | 7/2019 | Hohl et al. | |
| 10,407,999 B2 | 9/2019 | Pratt et al. | |
| 10,443,321 B2 | 10/2019 | Cravatte et al. | |
| 10,458,226 B2 | 10/2019 | Kuroiwa et al. | |
| 10,533,376 B2 | 1/2020 | Reimers | |
| 10,539,000 B2 | 1/2020 | Hadi | |
| 10,837,497 B2 | 11/2020 | Hauptmann et al. | |
| 11,136,834 B2 | 10/2021 | Hohl et al. | |
| 11,142,962 B2 | 10/2021 | Simanowski et al. | |
| 11,199,242 B2 | 12/2021 | Hohl et al. | |
| 11,448,015 B2 | 9/2022 | Hohl | |
| 2006/0000643 A1 | 1/2006 | Jenkins | |
| 2006/0243489 A1 * | 11/2006 | Wassell | E21B 44/005 |
| | | | 175/320 |
| 2007/0289778 A1 | 12/2007 | Watkins et al. | |
| 2010/0139977 A1 | 6/2010 | Watkins et al. | |
| 2012/0228028 A1 * | 9/2012 | Turner | E21B 44/00 |
| | | | 175/56 |
| 2012/0228029 A1 | 9/2012 | Reimers | |
| 2012/0325561 A1 * | 12/2012 | Leblanc | E21B 4/003 |
| | | | 384/590 |
| 2014/0037232 A1 * | 2/2014 | Marchand | E21B 4/003 |
| | | | 384/91 |
| 2014/0151122 A1 * | 6/2014 | Venugopal | E21B 17/073 |
| | | | 175/40 |
| 2014/0169900 A1 | 6/2014 | Lawes et al. | |
| 2014/0262650 A1 * | 9/2014 | Eppink | E21B 17/076 |
| | | | 188/297 |
| 2015/0233423 A1 * | 8/2015 | Peterson | F16C 43/02 |
| | | | 384/420 |
| 2016/0053557 A1 | 2/2016 | Whiteford et al. | |
| 2017/0089189 A1 | 3/2017 | Norris et al. | |
| 2017/0167205 A1 | 6/2017 | Saeed et al. | |
| 2017/0328142 A1 * | 11/2017 | Pratt | E21B 47/18 |
| 2018/0128051 A1 * | 5/2018 | von Gynz-Rekowski | |
| | | | E21B 4/003 |
| 2018/0187539 A1 | 7/2018 | Hadi | |
| 2018/0252089 A1 | 9/2018 | Hohl et al. | |
| 2018/0371889 A1 | 12/2018 | Hohl et al. | |
| 2019/0195306 A1 | 6/2019 | Mobeck | |
| 2019/0234149 A1 | 8/2019 | Clausen et al. | |
| 2019/0277091 A1 | 9/2019 | Jones et al. | |
| 2019/0284881 A1 | 9/2019 | Hohl et al. | |
| 2019/0330922 A1 * | 10/2019 | von Gynz-Rekowski | |
| | | | E21B 4/003 |
| 2019/0331171 A1 | 10/2019 | Toppazzini | |
| 2019/0360320 A1 | 11/2019 | Hohl | |
| 2020/0018124 A1 | 1/2020 | Hohl | |
| 2020/0018377 A1 | 1/2020 | Hohl et al. | |
| 2020/0072033 A1 | 3/2020 | Mauldin et al. | |
| 2020/0072045 A1 | 3/2020 | Bramlage et al. | |
| 2020/0116538 A1 | 4/2020 | Svihus | |
| 2020/0270959 A1 | 8/2020 | Liu et al. | |
| 2020/0284138 A1 | 9/2020 | Bowler et al. | |
| 2021/0079736 A1 | 3/2021 | Reckmann et al. | |
| 2021/0079737 A1 | 3/2021 | Peters | |
| 2021/0079738 A1 | 3/2021 | Peters et al. | |
| 2021/0079976 A1 * | 3/2021 | Peters | F16F 9/52 |
| 2021/0189806 A1 * | 6/2021 | Simanowski | F16F 7/108 |
| 2021/0189859 A1 * | 6/2021 | Volgmann | E21B 17/073 |
| 2022/0195812 A1 * | 6/2022 | Volgmann | E21B 17/07 |
| 2023/0133551 A1 * | 5/2023 | Volgmann | E21B 17/07 |
| | | | 464/20 |
| 2023/0374876 A1 * | 11/2023 | Moyes | E21B 31/005 |
| 2023/0407712 A1 * | 12/2023 | Reckmann | E21B 17/07 |

FOREIGN PATENT DOCUMENTS

| | | |
|---|---|---|
| WO | 2021050335 A1 | 3/2021 |
| WO | 2021050884 A1 | 3/2021 |

OTHER PUBLICATIONS

International Preliminary Report on Patentability issued in International Patent application PCT/US2021/024826, dated Oct. 13, 2022, 10 pages.

* cited by examiner

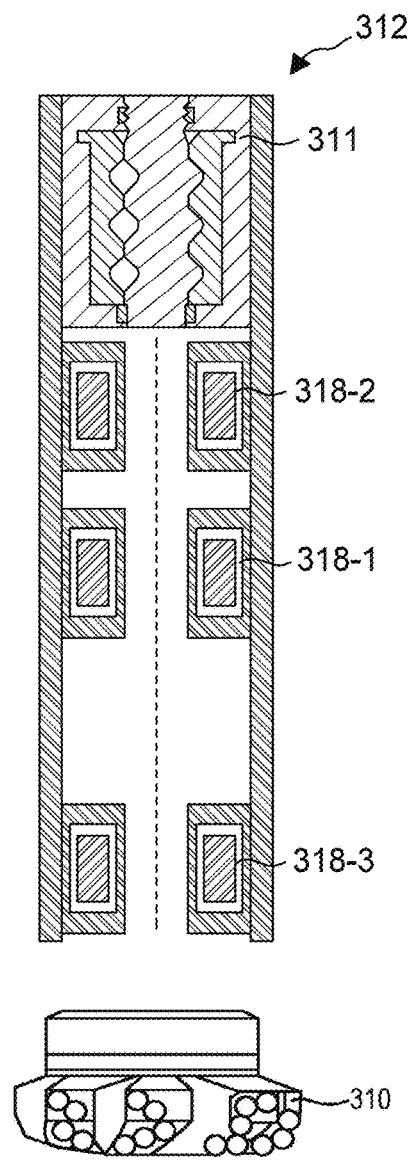
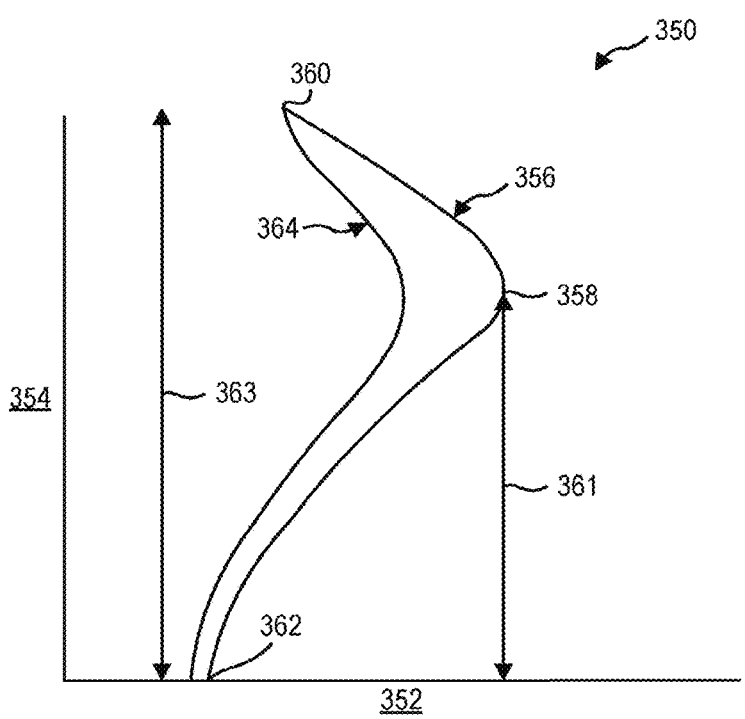
FIG. 3-1  FIG. 3-2

INERTIA DAMPING SYSTEMS AND METHODS

CROSS-REFERENCE TO RELATED APPLICATIONS

This application claims priority to, and the benefit of, U.S. Patent Application No. 63/002,039 filed Mar. 30, 2020, and U.S. Patent Application No. 63/022,825 filed May 11, 2020, both of which are incorporated herein by reference in their entirety.

BACKGROUND

Downhole drilling systems may include one or more rotating components. During operation, the rotating components may perform a variety of operations, including power generation, drilling, reaming, casing cutting, milling, steering, and other rotary operations. When rotating, the components may experience various types of vibrations, including axial, lateral, and torsional vibrations. Vibrations or oscillations in the tool may fatigue the downhole tool components (e.g., housings, shafts, etc.), increase wear, decrease tool effectiveness, or otherwise damage downhole tools.

SUMMARY

In some embodiments, a downhole inertia damping system include a collar having an inner surface. A plurality of dampers includes a housing. An inertia ring is rotatably installed inside the housing and a torsion fluid is located between the housing and the inertia ring.

In some embodiments, an inertia damping system includes a collar located between a downhole motor and a bit. A plurality of dampers is located between the downhole motor and the bit. The dampers include a housing and an inertia ring positioned inside the housing. The inertia ring is rotatable within the housing. A torsion fluid is located between the housing and the inertia ring.

In some embodiments, a method for damping oscillations includes securing a plurality of dampers to a collar. The method includes rotating an inertia ring inside of the housing of each damper independent of and in response to movement of the collar.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a cross-sectional view of an inertia damping system, and FIG. 3-2 is a representation of an oscillation profile of the inertia damping system of FIG. 3-1, according to at least one embodiment of the present disclosure;

FIG. 4-1 through FIG. 4-7 are transverse cross-sectional views of dampers at different oscillation states, according to at least one embodiment of the present disclosure;

FIG. 5-1 through FIG. 5-4 are further transverse cross-sectional views of dampers at different oscillation states, according to at least one embodiment of the present disclosure;

FIG. 6 is a longitudinal cross-sectional view of another inertia damping system, according to at least one embodiment of the present disclosure;

FIG. 7 is a longitudinal cross-sectional view of yet another inertia damping system, according to at least one embodiment of the present disclosure;

FIG. 8-1 is a longitudinal cross-sectional view of another inertia damping system, according to at least one embodiment of the present disclosure;

FIG. 8-2 is an enlarged view of a bearing and damper divider assembly within the inertia damping system of FIG. 8-1;

FIG. 8-3 is an end view of a bearing within the inertia damping system of FIGS. 8-1 and 8-2;

FIG. 9-1 is a transverse cross-sectional view of still another inertia damping system, according to at least one embodiment of the present disclosure;

FIG. 9-2 is a longitudinal cross-sectional view of the inertia damping system of FIG. 9-1, according to at least one embodiment of the present disclosure;

FIG. 9-3 is another longitudinal cross-sectional view of the inertia damping system of FIG. 9-1, according to at least one embodiment of the present disclosure;

FIG. 10-1 is a transverse cross-sectional view of a further inertia damping system, according to at least one embodiment of the present disclosure;

FIG. 10-2 is a transverse cross-sectional view of the inertia damping system of FIG. 10-1.

DETAILED DESCRIPTION

Embodiments of the present disclosure relate to devices, systems, and methods for damping vibrations/oscillations in downhole tools. For instance, downhole systems may experience a variety of motions, vibrations, and oscillations. In some embodiments, the movements may be associated with drilling activities. For example, a downhole tool may rotate to degrade a formation or other downhole materials by using a rotating bit, mill, or reamer. The engagement of the downhole tool and/or drill string with downhole materials, the flow of drilling or production fluids against or through the tool, or other conditions may cause vibrations, torsional oscillations, and other motions. For the purposes of this disclosure, the terms vibrations, oscillations, and other motions may be used interchangeably, unless otherwise stated. Left unchecked, these torsional oscillations may increase wear on the downhole tool, damage the downhole tool, increase fatigue on materials in the downhole tool, and combinations thereof. A damper may be installed on the downhole tool to reduce the effect of the torsional oscillations or axial vibrations. For example, an inertial damper may reduce the amplitude or frequency of the torsional oscillations. Of course, vibrations and oscillations may be a concern in other downhole contexts apart from drilling (e.g., testing, perforating, production, artificial lift, etc.), so a downhole environment should not be limited to drilling systems.

Figure 1:
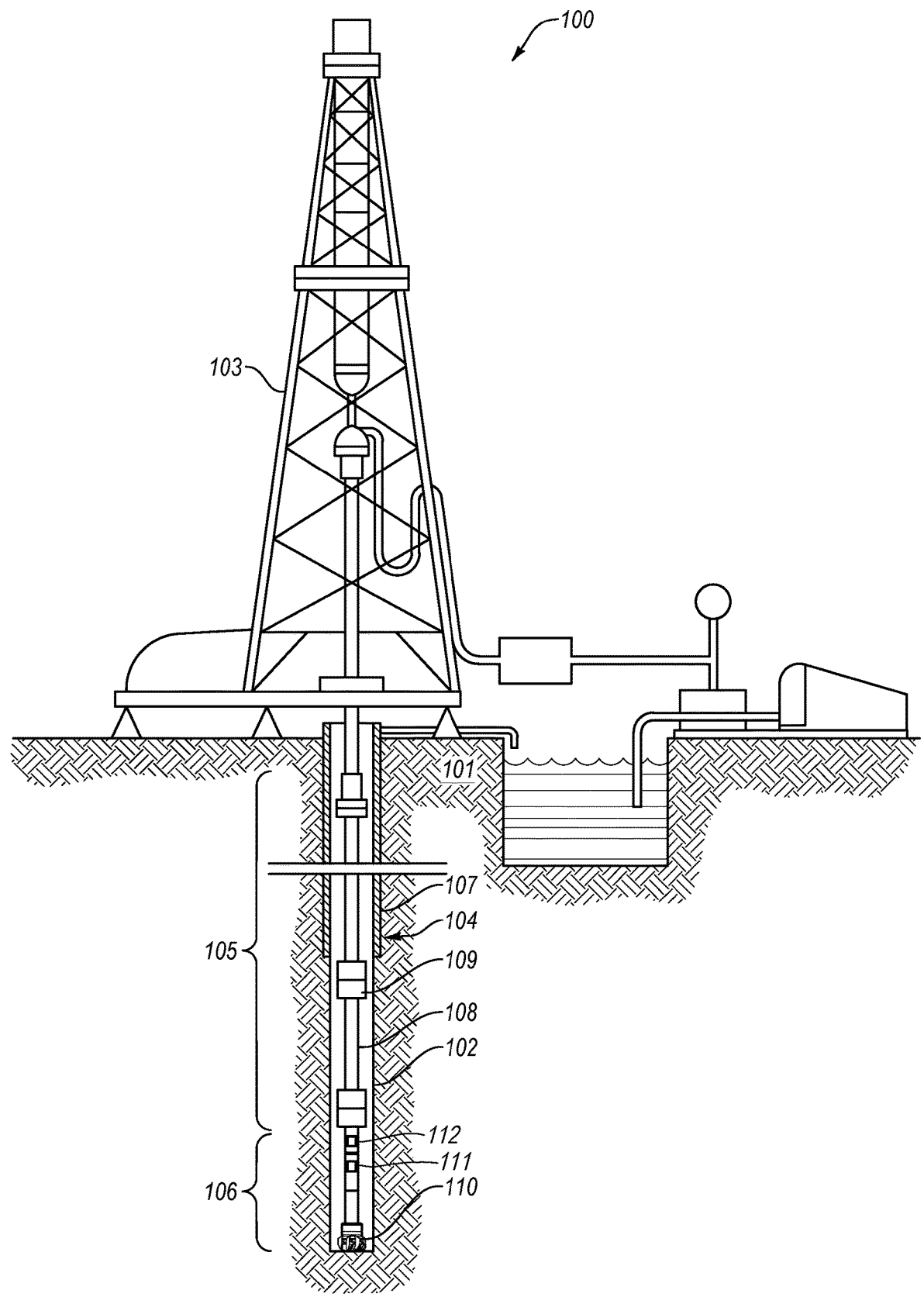
FIG. 1 is schematic view of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly (BHA) 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or damping tools, other components, or combinations of the foregoing. The BHA 106 may further include a rotary steerable system (RSS). The RSS may include directional drilling tools that change a direction of the bit 110, and thereby the trajectory of the wellbore. In some cases, at least a portion of the RSS may maintain a geostationary position relative to an absolute reference frame, such as gravity, magnetic north, or true north. Using measurements obtained with the geostationary position, the RSS may locate the bit 110, change the course of the bit 110, and direct the directional drilling tools on a projected trajectory.

In general, the drilling system 100 may include additional or other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

In some embodiments, a downhole motor 111 in the BHA 106 may generate power for downhole systems and/or provide rotational energy for downhole components (e.g., rotate the bit 110). The downhole motor 111 may be any type of downhole motor 111, including a positive displacement pump (such as a progressive cavity motor) or a turbine. In some embodiments, the downhole motor 111 may be powered by the drilling fluid. In other words, the drilling fluid pumped downhole from the surface may provide the energy to rotate a rotor in the downhole motor 111. The downhole motor 111 may operate with an optimal pressure differential or pressure differential range. The optimal pressure differential may be the pressure differential at which the downhole motor 111 may not stall, burn out, overspin, or otherwise be damaged. In some cases, the downhole motor 111 may rotate the bit such that the drill string 105 may not be rotated at the surface.

The bit 110 in the BHA 106 may be any type of bit suitable for degrading downhole materials. For instance, the bit 110 may be a drill bit suitable for drilling the earth formation 101. Example types of drill bits used for drilling earth formations are fixed cutter or drag bits (or PDC bits), roller cone bits, coring bits, and combinations thereof (e.g., hybrid roller cone and fixed cutter bits). In other embodiments, the bit 110 may be a mill used for removing metal, composite, elastomer, other downhole materials, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole. In still other embodiments, the bit 110 may include a reamer. For instance, an underreamer may be used in connection with a drill bit and the drill bit may bore into the formation while the underreamer enlarges the size of the bore.

Rotating the drill string 105 and/or operation of the downhole motor 111 may wholly or partially cause oscillations in the drill string 105 and/or the BHA 106. The oscillations can have various effects. For instance, the oscillations are a generated by taking energy input into the system. Accordingly, that energy used by the oscillations is not input into the bit, and reduces the efficient transfer of energy to the bit. The vibrations/oscillations may also damage one or more components of the BHA 106. In some embodiments, the oscillations may be at least partially damped using a downhole inertia damping system 112. In some implementations, the downhole inertia damping system 112 may be located between the downhole motor 111 and the bit 110. Using the downhole inertia damping system 112 to reduce the oscillations between the downhole motor 111 and the BHA 106 may reduce damage to components of the BHA 106 and/or more efficiently transfer power/energy to the bit, thereby increasing system efficiency, reducing downtime, or decreasing costs. In other embodiments, the inertia damping system 112 may be within the BHA 107 but above the downhole motor 111. In other embodiments, the inertia damping system may be outside of the BHA 106. Further still, in some embodiments, a downhole motor 111 may not be present and the inertia damping system 112 may be used. In at least some embodiments, the downhole motor 111 may include or be replaced by a steering tool (e.g., a RSS), and the inertia damping system 112 may be positioned above, below, or within the steering tool.

Figure 2:
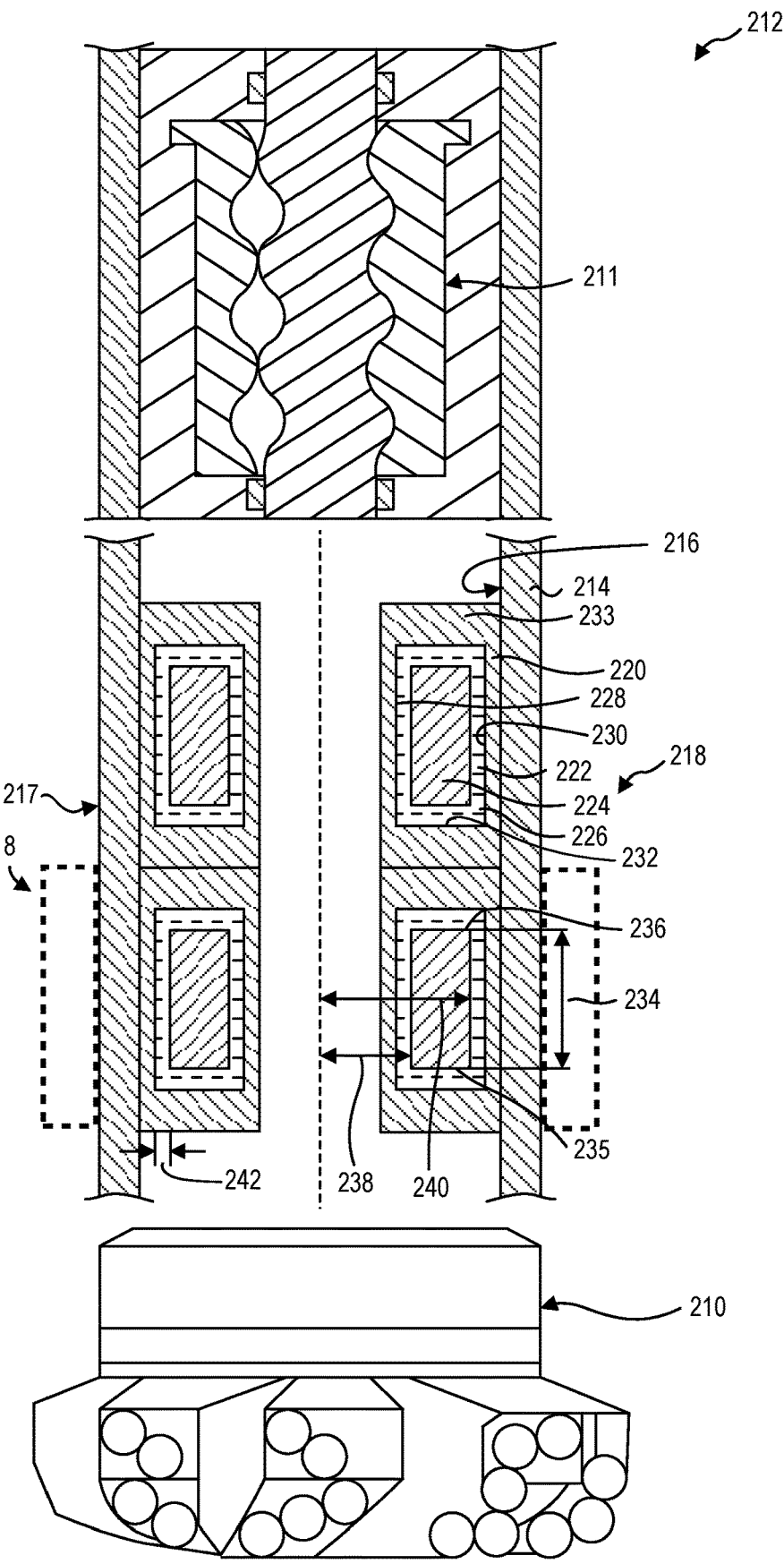
FIG. 2 is a longitudinal cross-sectional view of an inertia damping system, according to at least one embodiment of the present disclosure.

FIG. 2 is a cross-sectional view of an example downhole inertia damping system 212, according to at least one embodiment of the present disclosure. The downhole inertia damping system 212 includes a collar 214 having an inner surface 216. In some embodiments, the collar 214 may be any collar. For example, the collar 214 may be a drill collar, an MWD collar or housing, and LWD collar or housing, a housing or body of a steering tool (e.g., an RSS), the housing or body of a downhole tool (e.g., a stabilizer, reamer, casing cutter, mill), the collar or housing of any other downhole tool, sub, any other downhole element, and combinations thereof. One or a plurality of dampers 218 may be coupled to the inner surface 216 of the collar 214. While the embodiments of the present disclosure illustrate and discuss the dampers 218 as being coupled to the inner surface 216 of the collar 214, it should be understood that the one or more dampers 218 may be coupled to an outer surface 217 of the collar 214 (shown in phantom), between components, or to other components that may experience oscillations.

The damper(s) 218 may be torsional dampers that reduce or limit torsional oscillations of the collar 214, or downhole tools coupled to the collar 214, or other components. In FIG. 2, the dampers 218 (e.g., viscous dampers) are located between a downhole motor 211 and a bit 210. In some embodiments, the oscillation of the BHA may be greatest, most intense, or may cause the most damage between the downhole motor 211 and the bit 210. For instance, even if the oscillations are not the largest magnitude, they may resonate and thus increase damage, or may be at a high frequency and thus cycle rapidly and thereby lead to fatigue failures. Thus, by locating the plurality of dampers 218 between the downhole motor 211 and the bit 210, the dampers 218 may be placed in a location where they may dampen the potentially damaging oscillations in the BHA. One or more of the plurality of dampers 218 are configured to dampen high-frequency torsional oscillations (HFTO). Whereas some systems are configured to reduce or mitigate relatively low-frequency oscillations (e.g., less than approximately 1 Hz, less than approximately 5 Hz) or mid-frequency oscillations (e.g., between approximately 5 Hz to approximately 40 Hz), embodiments of the dampers 218 discussed below having a torsional fluid and/or granular material may be configured to dampen HFTO. It is appreciated that HFTO may include torsional oscillations greater than approximately 40 Hz, or greater than approximately 50 Hz. Moreover, the dampers 218 discussed below may be configured to dampen HFTO up to approximately 250 Hz, approximately 300 Hz, or approximately 350 Hz. Furthermore, systems described herein may have one or more dampers 218 configured to dampen one or more HFTO frequencies in the BHA.

The dampers 218 of FIG. 2 include a housing 220. The housing 220 may the portion of the dampers 218 that is connected to the collar 214. Some or each damper 218 of the plurality of dampers 218 may share a housing 220, although in other embodiments one or more dampers 218 has an individual housing 220. The housing 220 may be coupled to the collar 214, and in some embodiments is rotationally, longitudinally, or radially fixed to the collar 214. Thus, the housing 220 may not move relative to the collar 214 in at least some embodiments. In some embodiments, the housing 220 is integrally formed as part of the collar 214.

The collar 214 may be positioned axially between, and potentially extend a full length between, the downhole motor 211 and the bit 210. In some embodiments, the collar 214 includes multiple segments/collars connected end-to-end between the downhole motor 211 and the bit 210. Thus, vibrations, oscillations, and other motions of the collar 214 between the downhole motor 211 and the bit 210 may be transmitted along the collar 214. One or more dampers 218 installed between the downhole motor 211 and the bit 210 may reduce the oscillations not only at the location of the damper 218, but along the collar 214 between the downhole motor 211 and the bit 210, within the bit 210, and above the downhole motor 211.

The housing 220 in FIG. 2 defines an interior space 222. The interior space 222 may be defined by an inner wall 228, an outer wall 230, a lower wall 232 and an upper wall 233. In FIG. 2, the housing 220 is shown as having an annular construction around an axis of the collar 214. An inertia element 224 may be located in (e.g., placed in) the interior space 222. In some cases, the inertial element is a ring having an annular shape, although in other cases the inertia element may be a rod or partial ring. Thus, although the description refers to an inertia ring 224, it will be appreciated the inertia element 224 may have other constructions. The inertia ring 224 may be rotatably installed inside the housing in the interior space 222, and thus free to rotate within the interior space 222. With such construction, as the housing 220 or the collar 214 rotates or oscillates, the inertia ring 224 may be able to move or rotate at a different rotational rate or potentially in a different manner or direction.

A torsion fluid 226 can be located in the interior space 222, and can at least partially fill the gap between the inertia ring 224 and the walls defining the interior space 222 (e.g., the inner wall 228, the outer wall 230, the lower wall 232, and the upper wall 233) of the housing 220. The torsion fluid 226 may resist rotation of the inertia ring 224 inside the interior space 222. For example, the viscosity and density of the torsion fluid 226 may affect the resistance to rotation of the inertia ring 224, and therefore different torsion fluids 226 can change the damping effect of the dampers 218. A higher viscosity or density fluid may have higher resistance to rotation/movement of the inertia ring 224, and a lower viscosity or density may have lower resistance to rotation/movement of the inertia ring 224. In some embodiments, the torsion fluid 226 may include a silicone-based fluid, an oil-based fluid, a water-based fluid, a magnetorheological fluid, an electrorheological fluid, have other components, or include a combination of the foregoing. In some embodiments, the torsion fluid 226 includes or is replaced by a granular material, such as ceramic or graphite beads or flakes. In some embodiments, the torsion fluid 226 may include a combination of fluids and solids. In some embodiments, different dampers 218 in the same drill string may include different torsion fluids 226, or each damper 218 may include the same torsion fluid 226.

The inertia ring 224 can have various constructions and in some implementations includes one or more bores, cavities, channels, or other passages. For example, the inertia ring 224 may include one or more cavities and the torsion fluid 226 may be located in and/or flow into and out of the one or more cavities in the inertia ring 226. This flow may reduce the torsional oscillations or reduce/dissipate heat generated by the inertia ring 226.

In some embodiments, the inertia ring 224 rotates out of sync with the collar 214, by rotating at a different rotational rate or in a different rotational direction than the collar 214, relative to a common reference frame. Thus, the rotation or other movement of the inertia ring 224 may not be synchronized with the collar 214. During oscillation of the collar 214, the collar 214 may rotate in a first direction and a second direction (or rotate in the first direction at first and second speeds). When rotating in the first direction (or first speed), the collar 214 may cause the housing 220 to rotate with it. The torsion fluid 226 and the inertia ring 224 can be rotationally independent of the housing 220 (which includes being rotationally out of sync with the housing 220). As the housing 220 rotates, the walls of the housing 220 may exert a frictional shear force on the torsion fluid 226 and/or the inertia ring 224, or the torsion fluid 226 may exert a frictional/shear force on the inertia ring 224, thereby applying a torque on the inertia ring 224. This may urge the inertia ring 224 to rotate in the first direction. The collar 214 and the housing 220 may then oscillate and thereby move in a second direction (or in the first direction at a different speed). This may cause an opposite or reduced rotational force on the torsion fluid 226 and the inertia ring 224, or a reduced or increased rotational force. However, because the inertia ring 224 is rotating in the first direction at a given speed, the inertia ring 224 may resist rotation in the second direction or resist an increase/decrease in speed. This resistance to rotational change may exert a counter-torque on the housing 220 and the collar 214. This counter torque may reduce the amplitude or frequency of the oscillation of the collar 214, which may reduce fatigue on components connected to the collar 214, reduce damage and wear, extend the life of components connected to the collar 214, or more efficiently transfer energy through the collar 214 to the bit 210.

In some embodiments, the mass of the inertia ring 224 may affect the resistance to rotation of the inertia ring 224 and the damping effect of the inertia ring 224. The mass of the inertia ring 224 may be affected by its physical size and construction or the density. For example, a larger inertia ring 224 has greater mass than a smaller inertia ring 224 of the same material, which can change the damping effect of the inertia ring 224. In FIG. 2, the inertia ring 224 has a height 234, which is the distance between axially lower surface 235 and axially upper surface 236 of the inertia ring 224. In some embodiments, the height 234 may be in a range having a lower value, an upper value, or lower and upper values including any of 1 in. (2.54 cm), 2 in. (5.01 cm), 3 in. (7.62 cm), 5 in. (12.7 cm), 7.5 in. (19.05 cm), 10 in. (25.4 cm), 12 in. (30.48 cm), 2 ft. (0.61 m), 5 ft. (1.52 m), 10 ft. (3.05 m), 20 ft. (6.10 m), 30 ft. (9.14 m), or any value therebetween. For example, the height 234 may be greater than 1 in. (2.54 cm). In another example, the height 234 may be less than 30 ft. (9.14 m). In yet other examples, the height 234 may be any value in a range between 1 in. (2.54 cm) and 30 ft. (9.14 m), such as between 2 in. (5.01 cm) and 10 in. (25.4 cm) or between 2 in. (5.01 cm) and 7.5 in. (19.05 cm). In other examples, the height 234 may be greater than 30 ft. (9.14 m) or less than 1 in. (2.54 cm).

The inertia ring 224 also has a cross-sectional width which is the difference between an inner radius 238 and an outer radius 240 of the inertia ring 224. In some embodiments, the inner radius 238 may be in a range having a lower value, an upper value, or lower and upper values including any of 1.0 in (2.54 cm), 1.5 in. (3.81 cm), 2.0 in. (5.08 cm), 2.5 in. (6.35 cm), 3.0 in. (7.62 cm), 3.5 in. (8.89 cm), 4.0 in. (10.16 cm), 5.0 in. (12.7 cm), 5.5 in. (13.97 cm), 6.0 in. (15.24 cm), 10 in. (25.4 cm), 15 in. (38.1 cm), or any value therebetween. For example, the inner radius 238 may be greater than 1.5 in. (3.81 cm). In another example, the inner radius 238 may be less than 15 in. (38.1 cm). In yet other examples, the inner radius 238 may be any value in a range between 1.0 in. (2.54 cm) and 15 in. (38.1 cm), and may be between 2.0 in. (5.8 cm) and 6.0 in. (15.24 cm), or between 2.5 in. (6.35 cm) and 5.0 in. (12.7 cm). In some examples, the inner radius 238 may be less than 1.0 in. (2.54 cm) or greater than 15 in. (38.1 cm).

In some embodiments, the outer radius 240 may be in a range having a lower value, an upper value, or lower and upper values including any of 1.5 in. (3.81 cm), 2.0 in. (5.08 cm), 2.5 in. (6.35 cm), 3.0 in. (7.62 cm), 3.5 in. (8.89 cm), 4.0 in. (10.16 cm), 5.0 in. (12.7 cm), 6.0 in. (15.24 cm), 10 in. (25.4 cm), 15 in. (38.1 cm), 20 in. (50.8 cm), or any value therebetween. For example, the outer diameter 240 may be greater than 1.5 in. (3.81 cm). In another example, the outer diameter 240 may be less than 20 in. (50.8 cm). In yet other examples, the outer diameter 240 may be any value in a range between 1.5 in. (3.81 cm) and 20 in. (50.8 cm), such as between 1.5 in. (3.81 cm) and 12.5 in. (31.75 cm), or between 3.5 in. (8.98 cm) and 10 in. (25.4 cm). In some examples, the outer diameter 240 may be less than 1.5 in. (3.81 cm) or greater than 20 in. (50.8 cm).

The mass of the inertia ring 224 is determined by the shape, size, and density of the material of the inertia ring 224. In some embodiments, the inertia ring 224 includes or is made from tungsten alloys, steel alloys, aluminum alloys, any other metal alloy, ceramics, carbides, other non-metallic materials, or combinations of the foregoing. In some embodiments, the inertia ring 224 is a unitary component.

In the embodiment shown, the inertia ring 224 may passively rotate, that is to say the inertia ring 224 rotates in response to the motion of the collar 214 or the housing 220. For instance, frictional or shear forces on the fluid 226 may cause the inertia ring 224 to rotate. In some embodiments, passively rotated inertia rings 224 may reduce the overall length of the inertia damping system 212, and may be relatively easy to install with reduced cost. This may increase the locations in which the inertia damping system 212 may be used. Furthermore, because the inertia rings 224 may be passively rotated, individual inertia rings 224 may be placed in or on different downhole tools without lengthening the tool or BHA. In other embodiments, active or energized inertia rings 224 can rotate even without movement of the collar 214 or the housing 220.

In some embodiments, the interior space 222 may be larger than the inertia ring 224. The torsion fluid 226 may fill the space, or gap 242, between the walls of the interior space 222 and the inertia ring 224. In some embodiments, the gap 242 may help to determine the amount of oscillation damping provided by the torsion fluid 226. The gap 242 is shown as a radial gap and as being relatively constant between the inertia ring 224 and the inner wall 228 and the outer wall 230. In some embodiments, however, the gap 242 may not be constant. For instance, as a BHA (e.g., BHA 106) bends during a directional application, the gap 242 may change and cause some portions of the inertia ring 224 to become closer to the outer wall 230. Thus, the gap 242 should be considered an average gap, or half the difference between the width of the inertia ring 224 and the width of the interior space 222. Additionally, while the inertia ring 224 and interior space 222 are schematically shown as having linear surfaces in cross-section as when the inertia ring 224 is formed as a rectangular toroid, any or all of such surfaces may be curved or contoured in other embodiments (e.g., the inertia ring 224 may be a torus).

In some embodiments, the gap 242 may be in a range having a lower value, an upper value, or lower and upper values including any of 0.0001 in. (2.54 μm), 0.0005 in. (12.7 μm), 0.001 in. (25.4 μm), 0.002 in. (50.8 μm), 0.003 in. (76.2 μm), 0.004 in. (101.6 μm), 0.005 in. (127.0 μm), 0.006 in. (152.4 μm), 0.007 in. (177.8 μm), 0.008 in. (203.2 μm), 0.009 in. (228.6 μm), 0.010 in. (254.0 μm), 0.050 in. (0.127 cm), 0.10 in. (0.25 cm), 0.5 in. (1.27 cm), 1 in. (2.54 cm), 2 in. (5.08 cm), 3 in. (7.62 cm), 4 in. (10.2 cm), 5 in. (12.7 cm), or any value therebetween. For example, the gap 242 may be greater than 0.0001 in. (2.54 μm). In another example, the gap 242 may be less than 5 in. (12.7 cm). In yet other examples, the gap 242 may be any value in a range between 0.0001 in. (2.54 μm) and 5 in. (12.7 cm), such as between 0.0005 in. (12.7 μm) and 0.25 in. (6.35 mm).

As discussed herein, the inertia element 224 may help to damp torsional oscillations of the housing 214. The damping of torsional oscillations may be modeled as energy dissipated in a single vibration cycle. The energy dissipated in a single vibration ($E_{loss}$) may be modeled according to Eq. 1:

$$E_{loss} = \frac{\pi C_{tor} v_{hsg}^2 J_r^2 \omega}{\sqrt{J_r^2 \omega^2 + C_{tor}^2}}, \qquad \text{Eq. 1}$$

where $C_{tor}$ is the torsional damping coefficient, $V_{hsg}$ is the rotational velocity of the housing, $\omega$ is the angular velocity, and $J_r$ is the rotational inertia of the inertia element 224. The torsional damping coefficient ($C_{tor}$) may be determined according to Eq. 2:

$$C_{tor} = \frac{2\pi \mu D(r_2^3 + r_1^3)}{h} + \frac{\pi \mu (r_2^4 - r_1^4)}{h}, \qquad \text{Eq. 2}$$

where $\mu$ is the viscosity of the torsion fluid 226, D is the height 234, $r_1$ is the inner radius 238, $r_2$ is the outer radius 240, and h is the gap 242. The rotational inertia (e.g., $J_r$) may be determined according to Eq. 3:

$$J_r = \frac{m(r_1^2 + r_2^2)}{2}, \qquad \text{Eq. 3}$$

where m is the mass of the inertia element 224. As may be seen through an analysis of Eq. 2 and Eq. 3, changing the size of the inertia element 224 may change the inertial properties of the inertia element 224. For example, increasing $r_2$ may increase $C_{tor}$ and $J_r$. In some embodiments, m may be changed without affecting $C_{tor}$. For example, the density of the inertia element 224 may be increased. For the same size inertia element 224, this would increase m, thereby increasing $J_r$, while $C_{tor}$ remains the same. Furthermore, changing the properties of the inertia fluid 226 may change $C_{tor}$ while $J_r$ remains unchanged. For example, increasing p may increase $C_{tor}$.

An analysis of Eq. 1 shows that $E_{loss}$ may be changed by changing one or both of $C_{tor}$ and $J_r$. If the energy of the oscillations is known or predictable, then the energy loss from the inertia damping system 212 may be optimized to the oscillation energy. In this manner, an operator may change the properties of the inertia damping system 212 (e.g., size and/or density of the inertia element 224, properties of the inertia fluid 226) to optimize boss for a given application.

In at least one embodiment, the inertia element 224 has a D of 6 in. (15.2 cm), $r_1$ of 1.3 in. (3.3 cm), $r_2$ of 2 in. (5.1 cm), h of 0.005 in. (0.127 mm), and $\mu$ of 2,400 cSt. Inserting these values into Eq. 1, Eq. 2, and Eq. 3 provides result in an $E_{loss}$ of about 0.25 lbf-ft.s/rad. If $\mu$ is changed to 12,000 cSt, then $E_{loss}$ of about 1.25 lbf-ft.s/rad.

The bit has a bit energy (e.g., $W_{bit}$), which is the amount of energy that the bit adds to the oscillation system. The bit energy may be determined according to Eq. 4:

$$W_{bit} = \frac{T_{amp} v_{bit} \pi}{\omega}, \qquad \text{Eq. 4}$$

where $T_{amp}$ is the amplitude of the oscillation torque and $v_{bit}$ is the oscillation velocity amplitude of the bit. Based on the $E_{loss}$ and the $W_{bit}$, the system has an energy dissipation ratio, which may be determined according to Eq. 5:

$$\text{Energy Dissipation Ratio} = \frac{E_{loss}}{W_{bit}}. \qquad \text{Eq. 5}$$

In some embodiments, the energy dissipation ratio may be a representation of the amount of torsional oscillation energy damped by the inertia damping system 212. In some embodiments, the energy dissipation ratio may be in a range having a lower value, an upper value, or lower and upper values including any of 1%, 5%, 10%, 15%, 20%, 25%, 50%, 75%, 95%, or any value therebetween. For example, the energy dissipation ratio may greater than 1%. In some examples, the energy dissipation ratio may be less than 95%. In some examples, the energy dissipation ratio may be any value in a range between 1% and 95%, such as between 1% and 10%, or between 5% and 20%. In other embodiments, the energy dissipation ratio may be less than 1% or greater than 95%.

In the embodiment shown, the inertia damping system 212 includes two dampers 218. However, it should be understood that the inertia damping system 212 may include more or fewer than three dampers. For example, the inertia damping system 212 may include one, two, three, four, five, six, seven, eight, nine, ten, or more dampers 218.

In the embodiment shown, each damper 218 is immediately longitudinally adjacent to another damper 218. In other words, the upper wall 233 of a first damper 218 is contacting the lower surface 232 of a second damper. In some embodiments, the wall 233 of the first damper 218 may be the lower surface 232 of the second damper 218. In other embodiments, there may be a space or gap between dampers 218 (see FIG. 3).

Figures 1, 4:
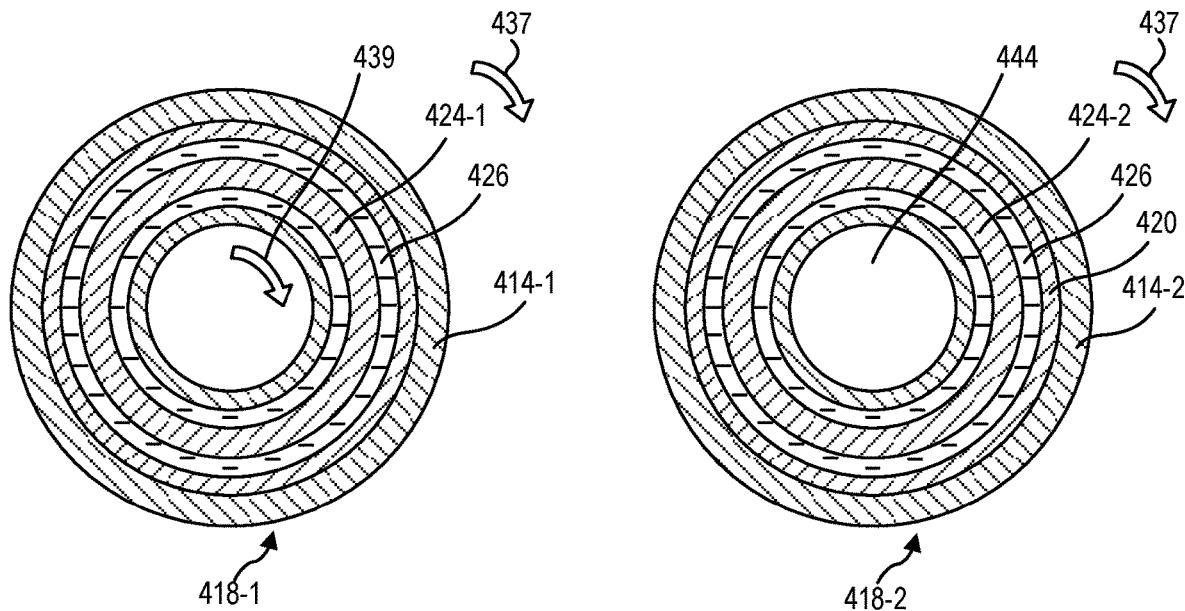
Figures 2, 4:
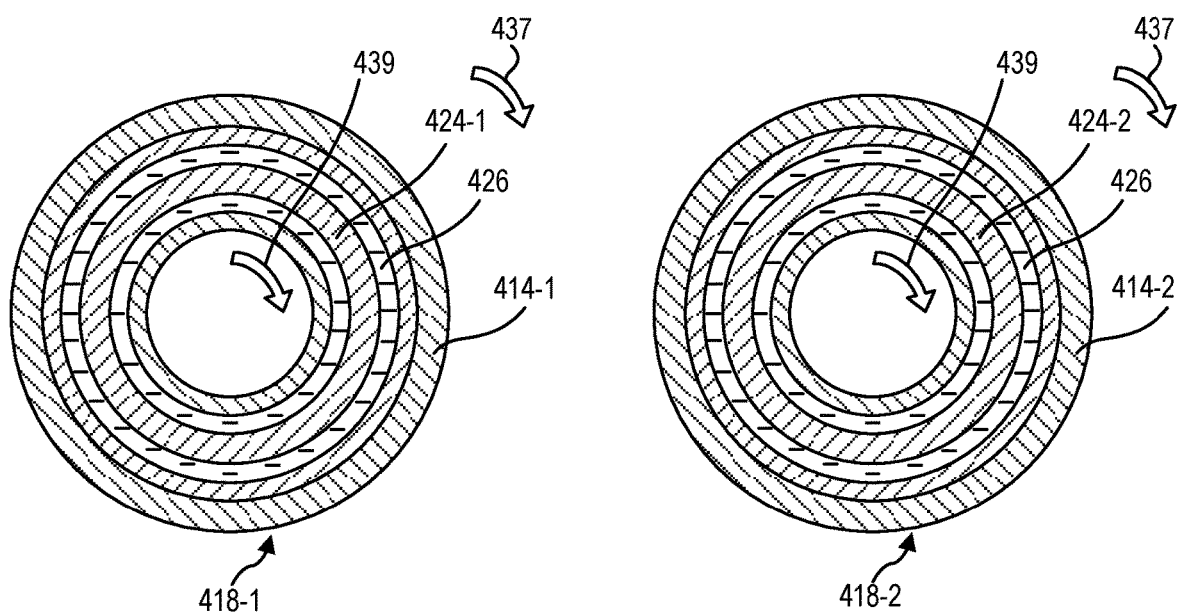
Figures 3, 4:
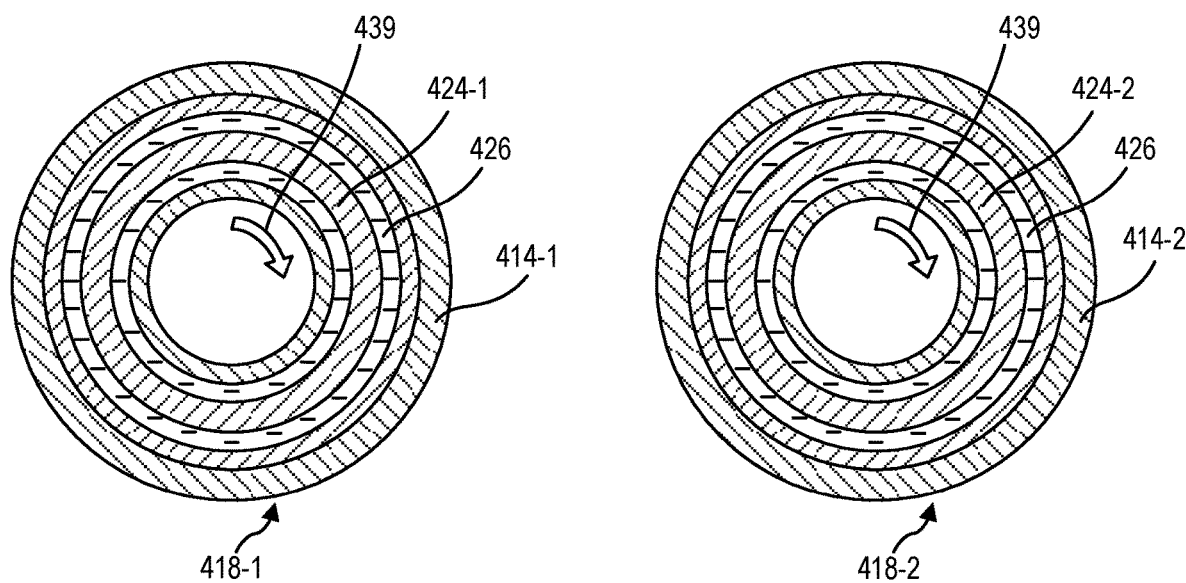
Figure 4:
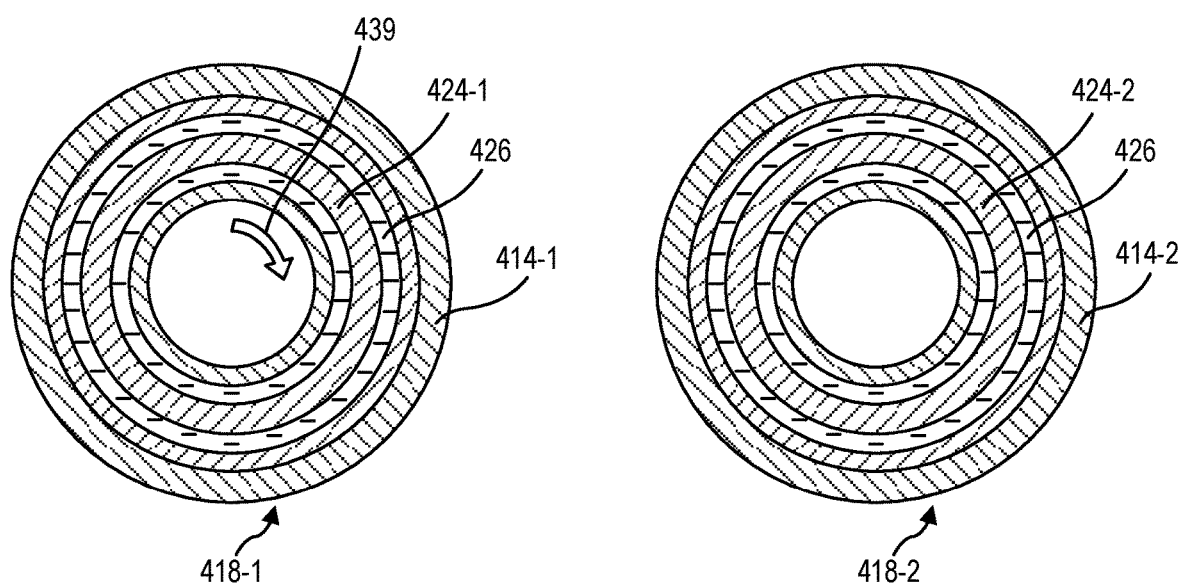

FIG. 3 (composed of FIGS. 3-1 and 3-2) includes a cross-sectional view of a torsional damping system 312 (FIG. 3-1), along with a representation of a torsional oscillation profile 350 of a downhole tool (FIG. 3-2), according to at least one embodiment of the present disclosure. The oscillation profile 350 shows the rotational speed oscillation magnitude 352 increasing along the x-axis and the distance 354 from the bit 310 increasing along the y-axis. An undamped oscillation profile 356 may represent the oscillation profile of a sample collar. The undamped oscillation profile 356 may have an oscillation peak 358, which may represent the maximum oscillation magnitude of the undamped oscillation profile 356. A damped oscillation profile 364 may represent the oscillation profile of the sample collar after damping. As the damped oscillation profile 364 shows when compared to the undamped oscillation profile 356, by utilizing one or more dampers, the oscillations of the collar may be reduced across the length of the profile.

The oscillation peak 358 of the undamped profile may occur at a peak distance 361 from the bit 310. The location of the bit is represented as point 362 in the profile 350. The peak distance 361 can be represented as a percentage of the motor distance 363, which is the distance between the bit location 362 and a downhole motor location 360. The percentage of the motor distance can be determined by dividing the peak distance 361 by the motor distance 363. In some embodiments, the peak location percentage may be in a range having a lower value, an upper value, or lower and upper values including any of 10%, 20%, 30%, 40%, 50%, 60%, 70%, 80%, 90%, or any value therebetween. For example, the peak percentage may greater than 10%. In some examples, the peak percentage may be less than 90%. In some examples, the peak percentage may be any value in a range between 10% and 90%, such as between 20% and 80%, or between 50% and 70%. In some embodiments, the peak percentage may be 0% (i.e., the oscillation peak 358 is located at the bit location 362). In some embodiments, the peak percentage may be 100% (i.e., the oscillation peak 358 is located at the downhole motor location 360). In some embodiments, the undamped oscillation profile 356 may include more than one oscillation peak 358.

The torsional damping system 312 of FIG. 3-1 is shown to the left of the oscillation profile 350 in FIG. 3-2 and has the same longitudinal scale as the oscillation profile 350. While the torsional damping system 312 shown includes a downhole motor 311, a bit 310, and three dampers 318-1, 318-2, 318-3 (collectively dampers 318), it should be understood that the torsional damping system 312 may include additional or different downhole tools that may be found in a BHA or drill string, different numbers of dampers, and the like.

In the embodiment shown, the first damper 318-1 is placed between the bit 310 and the motor 311. For instance, the first damper 318-1 may be placed at or near the location of the oscillation peak 358 on the oscillation profile 350. When placed near the location of the oscillation peak 358, the distance between the axial center of the first damper 318-1 and the oscillation peak 358 may be less than 2%, less than 5%, or less than 10% of the motor distance 363. Placing the first damper 318-1 at (or near) the oscillation peak 358 may provide the greatest reduction in the frequency or amplitude of the oscillations in some embodiments. As seen in the oscillation profile 356, the oscillation peak 358 in this embodiment is located nearer the downhole motor location 360 of the downhole motor 311 than the bit location 362 of the bit 310. Thus, the first damper 318-1 may be placed closer to the downhole motor 311 than the bit 310. To further reduce the oscillations near the oscillation peak 358, a second damper 318-2 may be placed between the first damper 318-1 and the downhole motor 311 (and thus also nearer the downhole motor 311 than the bit 310). By clustering the dampers 318 at or near the oscillation peak 358, the magnitude or frequency of the oscillations may be further reduced. In some embodiments, a third damper 318-3 may be placed at a location between the downhole motor 311 and the bit 310. For example, the third damper 318-3 may be placed closer to the bit 310 than to the downhole motor 311, or even closer to the bit 310 than to the first damper 318-1. Furthermore, in some embodiments, any number of dampers 318 may be placed between the bit 310 and the downhole motor 311. Spacing between the dampers 318 may be irregular as shown in FIG. 3, or there may be regular intervals/spacing between dampers. In some embodiments, irregular spacing between dampers 318 may generally reflect the oscillation profile 350. For instance, the greater the distance 354 and magnitude 352 between points on the oscillation profile 350, the greater the separation distance in the torsional damping system 312.

As discussed herein, in some embodiments, the first damper 318-1 may be placed near the oscillation peak 358 with a peak damper placement defined as a percentage of the motor distance 363. In some embodiments, the peak damper placement may be in a range having a lower value, an upper value, or lower and upper values including any of 0.5%, 1%, 2%, 3%, 4%, 5%, 6%, 7%, 8%, 9%, 10%, 15%, 20%, 25%, or any value therebetween. For example, the peak percentage may greater than 0.5%. In some examples, the peak damper placement may be less than 25%. In some examples, the peak damper placement be may be any value in a range between 0.5% and 25%, such as between 0.5% and 10%, or between 1% and 7%. In some embodiments, the peak damper placement may be 0% (i.e., the first damper 318-1 is located at oscillation peak 358). In some embodiments, it can be critical to performance of the torsional damping system 312 that the peak damper placement is within 10% to dampen the oscillation peak 358. In some embodiments, a single damper 318 may be placed within the peak damper placement. In other embodiments, a plurality of dampers 318 may be placed within the peak damper placement to further dampen the oscillation peak 358.

In some embodiments, placing dampers 318 at or near the oscillation peak 358 may cause the oscillation peak 358 to change locations, and to potentially change magnitude. For example, the dampers 318 may reduce the oscillations at the location of the oscillation peak 358 such that a different location may experience the highest oscillations on the BHA or drill string. In some embodiments, an oscillation peak 358 may be identified during downhole drilling operations or through simulation. The dampers 318 located at or near the peak may include a magnetorheological torsion fluid, an electrorheological torsion fluid, or any other suitable fluid. In some embodiments, by applying a magnetic field to a magnetorheological fluid (or an electrical field to an electrorheological fluid), the density of the torsion fluid may be changed, which may change (and potentially increase) the oscillation damping.

In some embodiments, the dampers 318 may be evenly placed between the bit 310 and the downhole motor 311, or evenly spaced along a portion of the distance between the bit 310 and the motor 311. Evenly spaced dampers 318 may help to damp oscillations across an entirety of the distance between the downhole motor 311 and the bit 310, or an entirety of the distance covered. In some embodiments, evenly spaced dampers 318 may be used for oscillation profiles 356 that change depending on the downhole tools being used or the drilling conditions.

In some embodiments, the oscillation peak 358 may be located above the downhole motor 311. In some embodiments, dampers 318 may be placed at any location along the drill string, including above the downhole motor 311. Of course, in some embodiments, a damper 318 may be used in a BHA or drill string that does not include a downhole motor. In such case, the position of the damper relative to an oscillation peak may be measured in relation to other components (e.g., distance between bit and LWD, between bit and reamer, between bit and RSS, etc.).

FIG. 4-1 is a transverse cross-sectional view of a first damper 418-1 and a second damper 418-2 according to some embodiments. As may be seen, the collars 414-1, 414-2 (collectively 414), the housing 420, and the inertia rings 424-1, 424-2 (collectively 424) can have annular cross-sectional shapes. In this manner, the inertia ring 424 may freely rotate within the housing 420. Of course, the inertia ring 424 may have different shapes, including partial rings as discussed herein.

The housing 420 can define or otherwise include a central bore 444. Drilling fluid may flow through the central bore 444. In some embodiments, as the inertia ring 424 rotates, heat is generated in the torsion fluid 426, the housing 420, or the inertia ring 424. The drilling fluid flowing through the central bore 444 may cool the housing 420, the inertia ring 424, and the torsion fluid 426, and may act as a heat sink for the torsional damping system 412.

The first damper 418-1 may be located at a different longitudinal location than the second damper 418-2. For example, the first damper 418-1 may be located at or near an oscillation peak (e.g., oscillation peak 358 of FIG. 3). The collar 414 may oscillate in response to downhole conditions and operations, and the first damper 418-1 and the second damper 418-2 may be connected to the same collar 414; however, the position of collar 414-1 may oscillate with a different oscillation energy, including amplitude, frequency, or direction, than the position at collar 414-2. In some embodiments, the first damper 418-1 and the second damper 418-2 may have identical construction (e.g., same mass, fluid, size, density, etc.), although they may have different constructions in other embodiments.

During operation, the collar 414 may oscillate and rotate in a first collar direction 437. First collar direction 427 is shown in a reference frame relative to the surrounding formation. The inertia ring 424 in FIG. 4-1 is not rotationally fixed to the housing 420 or the collar 414 and may therefore not rotate in sync with the collar 414. As the collar 414 and housing 420 rotate, the housing 420 can exert a frictional/shear torque in the first collar direction 437 on the torsion fluid 426, which may transfer the frictional torque in the first collar direction 437 to the inertia ring 424. The inertia ring 424 may, however, initially resist rotation such that the collar 414 rotates while the inertia ring 424 remains rotationally stationary or has a relative stationary position.

In some embodiments, the first inertia ring 424-1 may rotate or otherwise move with a different rotational energy than the second inertia ring 424-2. This may be a result of different oscillation energy of the collar 414-1 at the first inertia ring 424-1 than of the collar 414-2 at the second inertia ring 424-2. For example, in the embodiment shown in FIG. 4-1, oscillation and movement of the collar 414-1 has caused the first inertia ring 424-1 to rotate in the first ring direction 439 relative to the surrounding formation, by imparting at least some energy to the first inertia ring 424-1 through the housing 420 and torsion fluid 426. This may reduce the amplitude and/or the frequency of the oscillation of the collar 414-1. In the embodiment shown, the collar 414-2 is rotating in the first collar direction 437 at the second damper 418-2, but the second inertia ring 424-2 has not been caused to rotate by the collar 414-2. Thus, the first inertia ring 424-1 may be rotating while the second inertia ring 424-2 may not rotate, may rotate at a different magnitude, or may rotate in a different direction. It should be understood that, in some embodiments, the first inertia ring 424-1 may not rotate/move, and the second inertia ring 424-2 may rotate/move.

In FIG. 4-2, the oscillation of the collar 414-2 at the second damper 418-2 has caused the second inertia ring 424-2 to rotate in the first collar direction 439. The collar 414-1 at the first damper 418-1 may still be rotating in the first collar direction 439 and imparting at least a portion of its energy to the first inertia ring 424-1, which may rotate in the first collar direction 439 at the same or different rate of rotation as the second inertia ring 424-2.

In FIG. 4-3, the oscillation of the collar 414 at the first damper 418-1 and the second damper 418-2 has stopped. For example, the oscillation of the collar 414 may be at a point between rotational directions. However, the mass of the first inertia ring 424-1 and the second inertia ring 424-2 may cause the first inertia ring 424-1 and the second inertia ring 424-2 to continue to rotate in the first collar direction 439. In this manner, the first inertia ring 424-1 and the second inertia ring 424-2 may continue to impart energy to the collar 414 for a time, even after the collar 414 has stopped rotating.

In FIG. 4-4, the second inertia ring 424-2 has stopped rotating and the first inertia ring 424-1 is still rotating. This may result from the amount of energy imparted to the first inertia ring 424-1 by the collar 414-1 being greater than the amount of energy imparted to the second inertia ring 424-2 by the collar 414-2. In this manner, including a plurality of dampers 418 may allow the dampers 418 to damp different oscillation energies at different locations. This may help to damp oscillation across the length of the collar, drill string, or BHA.

Figures 4, 5:
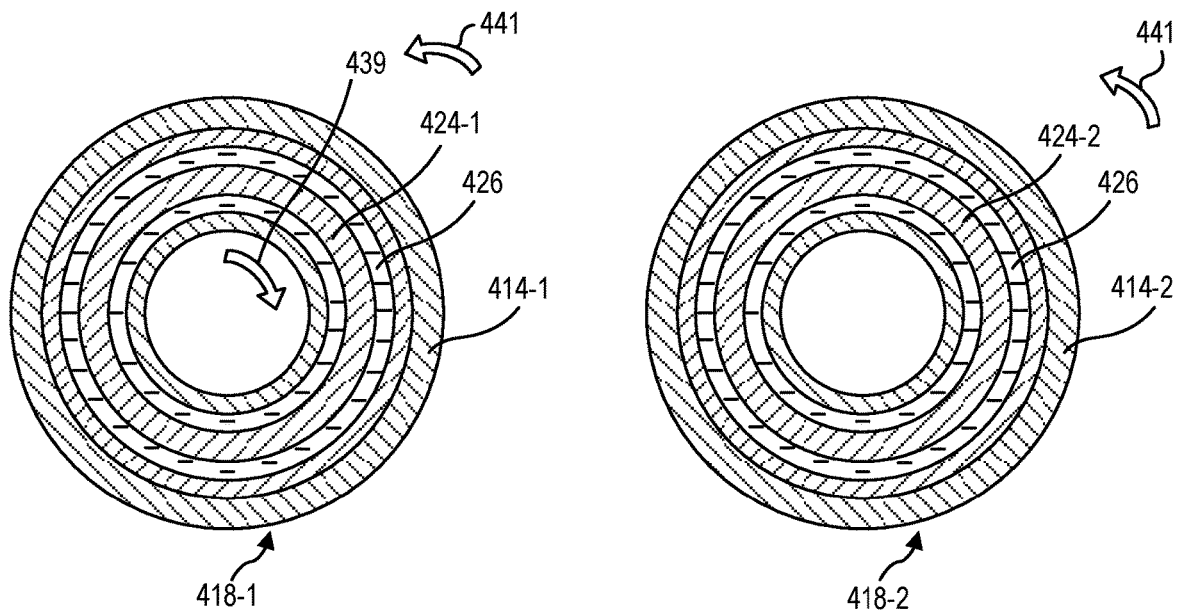

In FIG. 4-5, the collar 414 at both the first damper 418-1 and the second damper 418-2 is oscillating in a second collar direction 441, which is opposite the direction of the first collar direction 437 of FIGS. 4-1 and 4-2. The first inertia ring 424-1 may retain at least a portion of the rotational energy imparted to it by the collar 414-1 before the collar 414-1 oscillation causes rotation in the second collar direction 441. Thus, the collar 414-1 may impart at least a portion of its rotational energy to the first inertia ring 424-1 and the first inertia ring 424-1 may impart at least a portion of its rotational energy to the collar 414-1. This may reduce the oscillation energy of the collar 414-1, thereby reducing the amplitude or the frequency of the oscillation of the collar 414-1. In FIG. 4-5, the collar 414-2 at the second damper 418-2 may not have caused the second inertia ring 424-2 to yet rotate. Thus, the collar 414-2 may impart at least a portion of its rotational energy to cause the second inertia ring 424-2 to rotate, thereby damping at least a portion of the oscillation of the collar 414-2.

Figures 4, 5, 6:
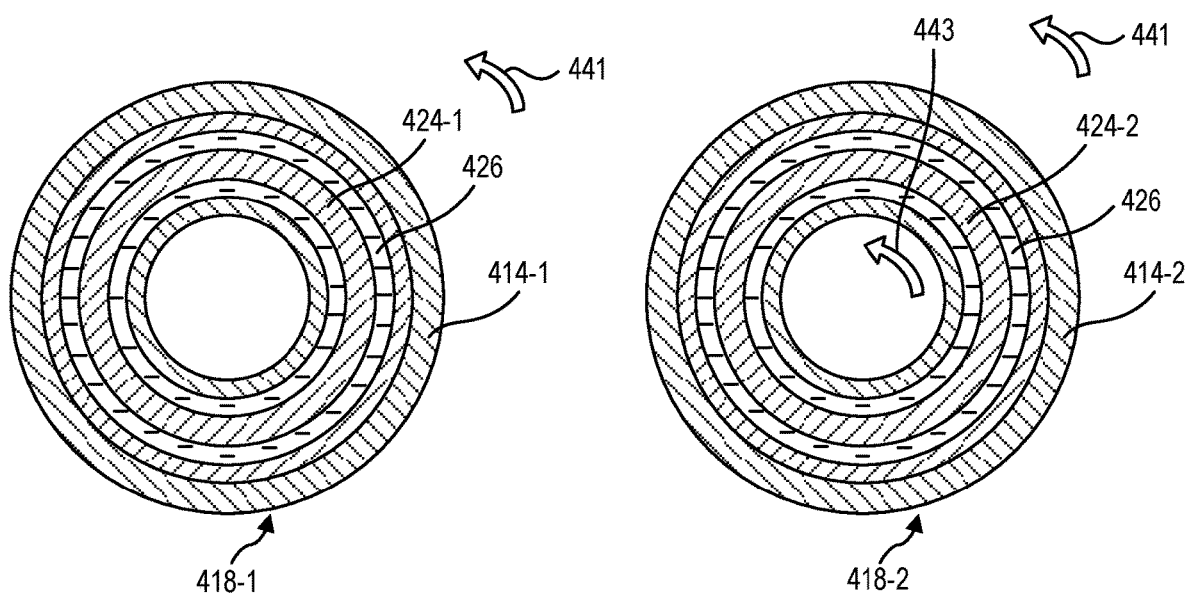

In FIG. 4-6, the collar 414-2 has imparted enough oscillation energy to the second inertia ring 424-2 to cause the second inertia ring 424-2 to rotate in the second ring direction 243. The first inertia ring 424-1 may still be rotating in the first ring direction 439. Thus, depending on the different oscillation energy of the collar 414 at the first damper 418-1 and the second damper 418-2, the first inertia ring 424-1 and the second inertia ring 424-2 may rotate in different directions.

In FIG. 4-7, the collar 414-1 at the position of the first damper 418-1 may oscillate in a different rotational direction than the collar 414-2 at the position of the second damper 418-2. In other words, the collar 414-1 may vibrate in a manner causing rotation in the first collar direction 437 and the collar 414-2 may vibrate in a manner causing rotation in the second collar direction 441. As described herein, the collar 414-1 and the first inertia ring 424-1 may impart at least a portion of their energy to each other, thereby at least partially reducing the oscillation of the collar 414-1. Similarly, the collar 414-2 and the second inertia ring 424-2 may impart at least a portion of their energy to each other, thereby at least partially reducing the oscillation of the collar 414-2. Because the first damper 418-1 and the second damper 418-2 are separate dampers 418, then each damper 418 may damp oscillations of the collar 414 in a manner unique to the damper's 418 location. In this manner, including a plurality of dampers 418 may reduce the oscillation of the collar 414 along the length of the collar 414. The collar 414-1 and collar 414-2 may also be the same collar, but can reflect different axial/longitudinal positions along the collar.

Referring now to FIG. 5-1, in some embodiments, a first inertia ring 524-1 of a first damper 518-1 may have a different mass than a second inertia ring 524-1 of a second damper 518-2. For example, the first inertia ring 524-1 may have a greater mass than the second damper 518-2 on account of use of a material having different density, or having a different size or shape. Thus, when the collar 514 rotates in the first collar direction 537 within a torsion fluid 526, the first inertia ring 524-1 may take longer to begin rotating than the second inertia ring 524-2. Accordingly, the second inertia ring 524-2 may begin to rotate in the first ring direction 539 before the first inertia ring 524-1. This may be because the first inertia ring 524-1 may take more energy to start rotating than the second inertia ring.

As may be seen in FIG. 5-2, the collar 514 may impart sufficient rotational energy to the first inertia ring 524-1 to cause the first inertia ring 524-1 to begin rotating in the first ring direction 539. Because the first inertia ring 524-1 is more massive than the second inertia ring, the collar 514 may impart more energy to the first inertia ring 524-1 (or more energy may be used to cause movement of the first inertia ring 524-1), and therefore the first inertia ring 524-1 may damp the oscillations of the collar 514 to a greater extent than the second inertia ring 524-2.

In FIG. 5-3, the rotation of the collar 514 has stopped and the second inertia ring 524-2 has transferred all of its energy to the collar 514 and stopped rotating as well. In some embodiments, because the first inertia ring 524-1 is more massive than the second inertia ring, the first inertia ring 524-1 may take longer to stop rotating in the first ring direction 539. In this manner, the first inertia ring 524-1 may continue to transfer its rotational energy to the collar 514.

In FIG. 5-4, the collar 514 is oscillating in the second collar direction 541. The first inertia ring 524-1 may continue to rotate in the first ring direction 539. In some embodiments, the collar 514 may cause the second inertia ring 524-2 to rotate in the second ring direction 543. The first inertia ring 524-1 and the second inertia ring 524-2 may impart their respective rotational energy to the collar 514 to damp the oscillations of the collar. Because the first inertia ring 524-1 has a different mass than the second inertia ring 524-2, the first inertia ring 524-1 may rotate in a different direction than the second inertia ring 524-2 at a particular moment in time, even if undergoing the same oscillation. This may increase the damping of the magnitude or frequency of oscillations of the collar. This may reduce damage to downhole tools, thereby saving time and money associated with tool repair.

It should be understood that an oscillation may include any change in rotational energy. Changes in rotational energy may include changes in rotational direction, changes in rotational rate, changes in oscillation frequency, changes in oscillation amplitude, and combinations thereof. Thus, embodiments of the present disclosure may include oscillations from the first collar direction to the first collar direction with a different rotational rate, oscillations from the first collar direction to no rotation, oscillations from the first collar direction to the second collar direction, oscillations from the second collar direction to the second collar direction with a different rotational rate, oscillations from the second collar direction to no rotation, and oscillations from the second collar direction to the first collar direction. Similarly, these varied oscillations in the collar may cause the inertia ring to change direction from the first ring direction to the second ring direction, to change the rotational rate of the inertia ring in the first ring direction, to change the rotation of the inertia ring from the first ring direction to no rotation, to change the rotational rate of the inertia ring in the second ring direction, to change the rotation of the inertia ring from the second ring direction to no rotation, or to change the rotation of the inertia ring from the second ring direction to the first ring direction.

FIG. 6 is a representation of a torsional damping system 612, according to at least one additional embodiment of the present disclosure. In the embodiment shown, the plurality of dampers 618 are longitudinally separated from each other. In other words, there is a damper spacing 646 between a first damper 618-1 and a second damper 618-2 (collectively dampers 618), which may be a percentage of the total inertia damper height 648. In some embodiments, the damper spacing 246 may be in a range having a lower value, an upper value, or lower and upper values including any of 0%, 2.5%, 5%, 10%, 25%, 50%, 75%, 100%, 150%, 200%, 300%, or any value therebetween. For example, the damper spacing 646 may be less than 300% of the damper height 648. In some examples, the damper spacing 646 may be greater than 0%, 5%, 10%, or 300% of the damper height 648. Where the dampers 618 have different heights 648, the damper spacing 646 may be determined as a function of the damper 618 having a lesser height 648.

In some embodiments, the damper spacing 646 may be determined based on the location(s) of the maximum oscillations. In some embodiments, at least three dampers 618 may be evenly spaced (e.g., have the same damper spacing 646) along the collar 614. In some embodiments, the dampers 618 may be unevenly spaced (e.g., have different damper spacing 646). In some embodiments, the dampers 618 may be spaced based on an oscillation profile of the collar 614 to place the dampers 618 where the oscillation is the highest or where peaks are observed or expected.

Figures 4, 5, 6, 7:
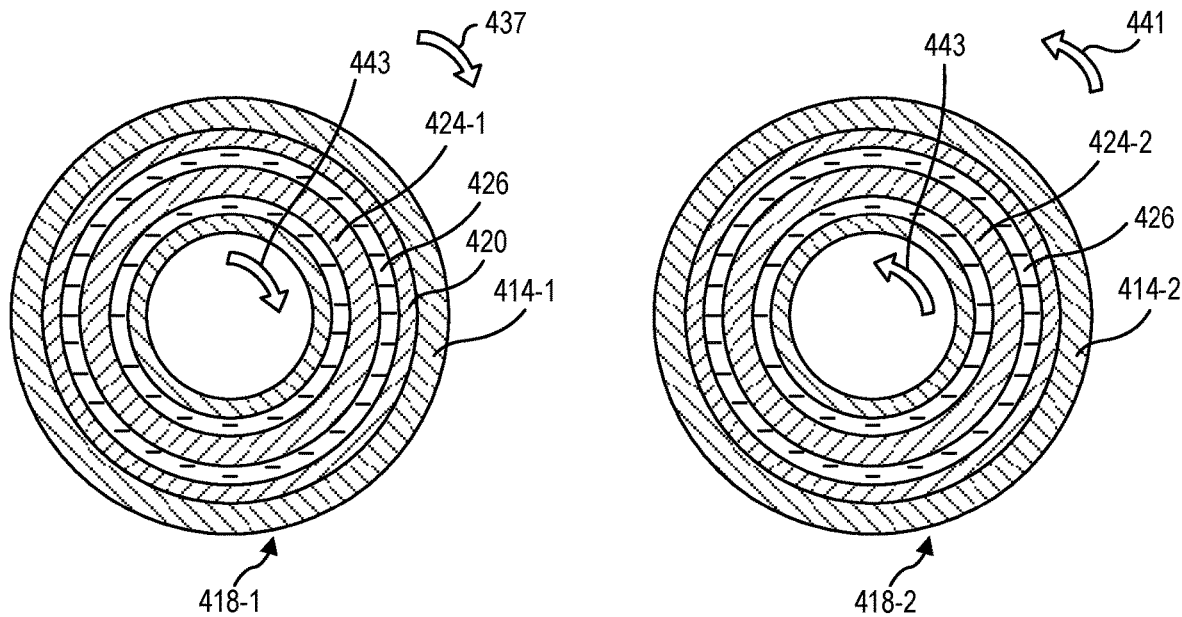
Figures 1, 5:
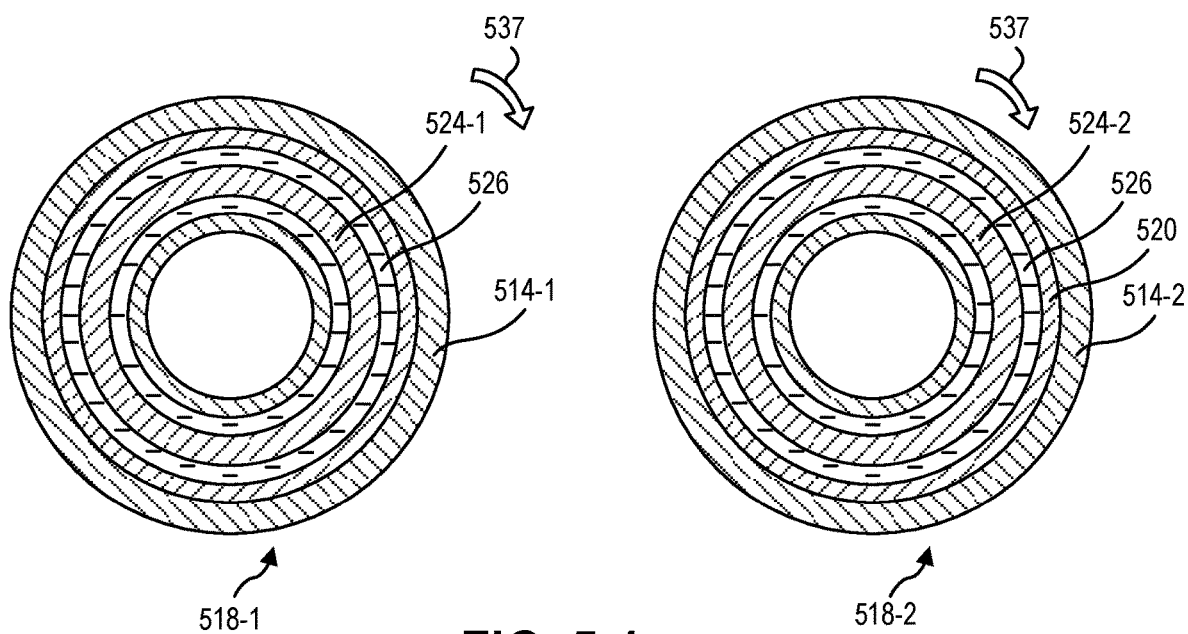
Figures 2, 5:
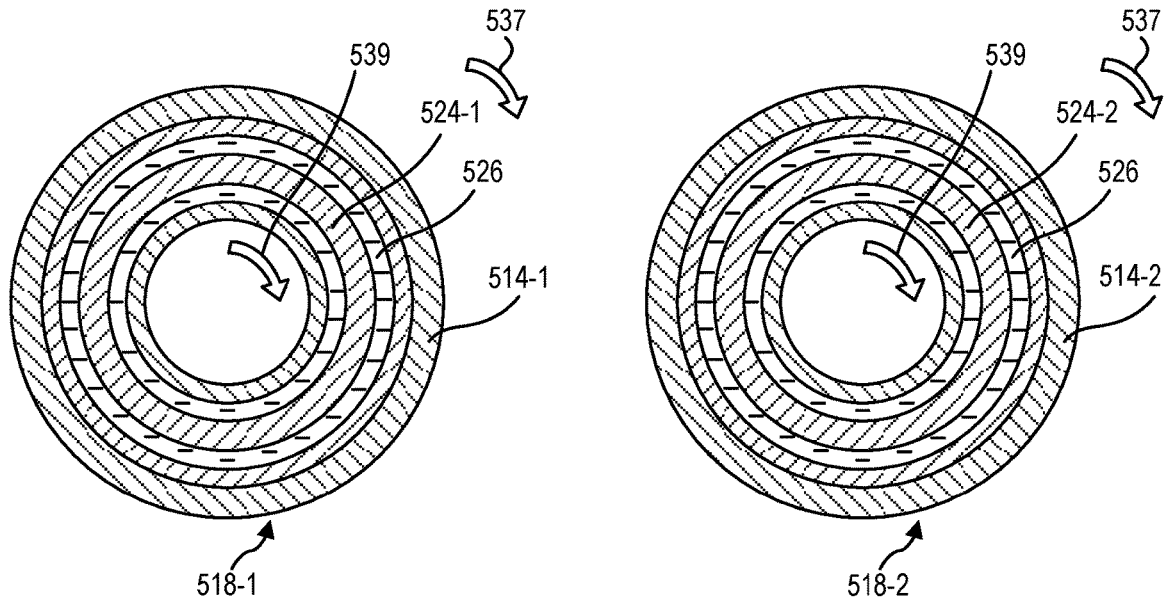
Figures 3, 5:
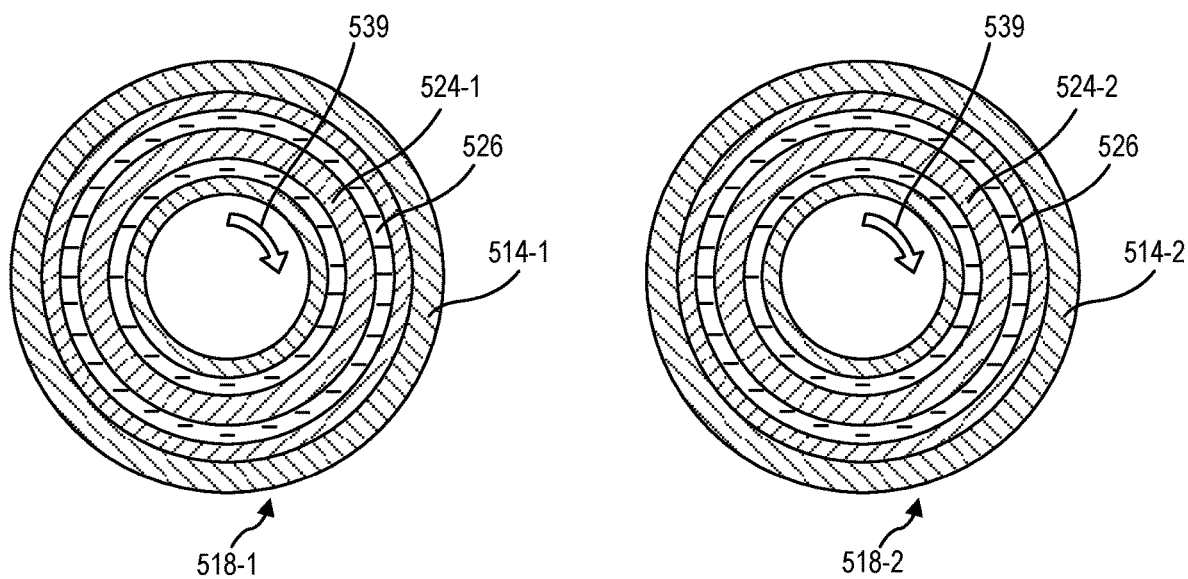
Figures 4, 5:
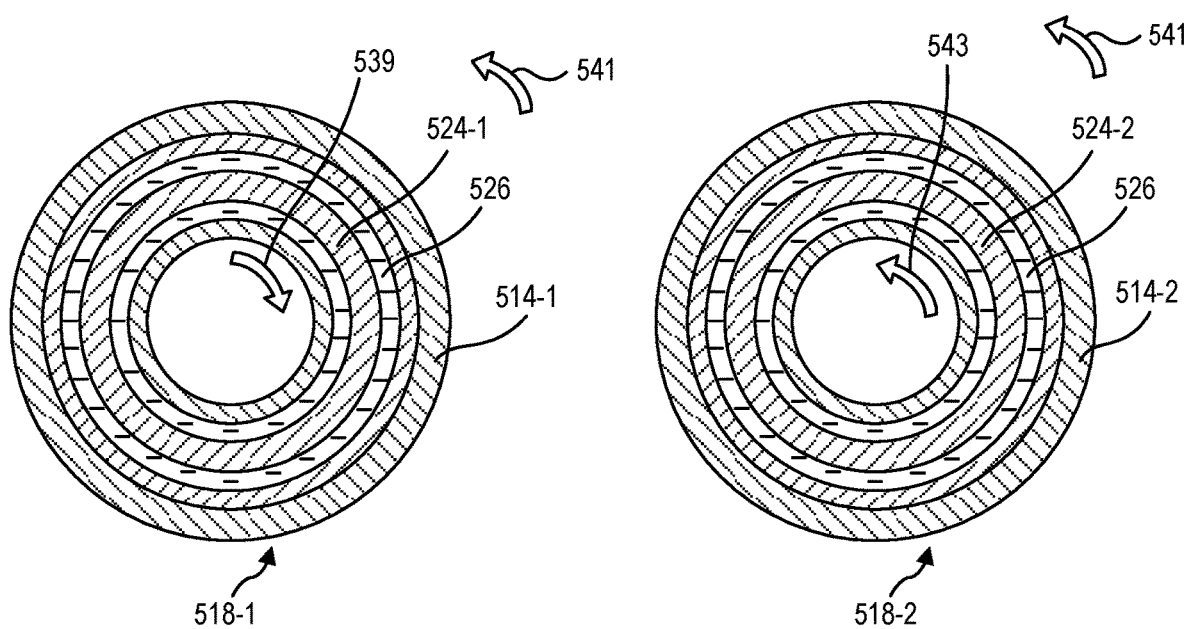
Figure 6:
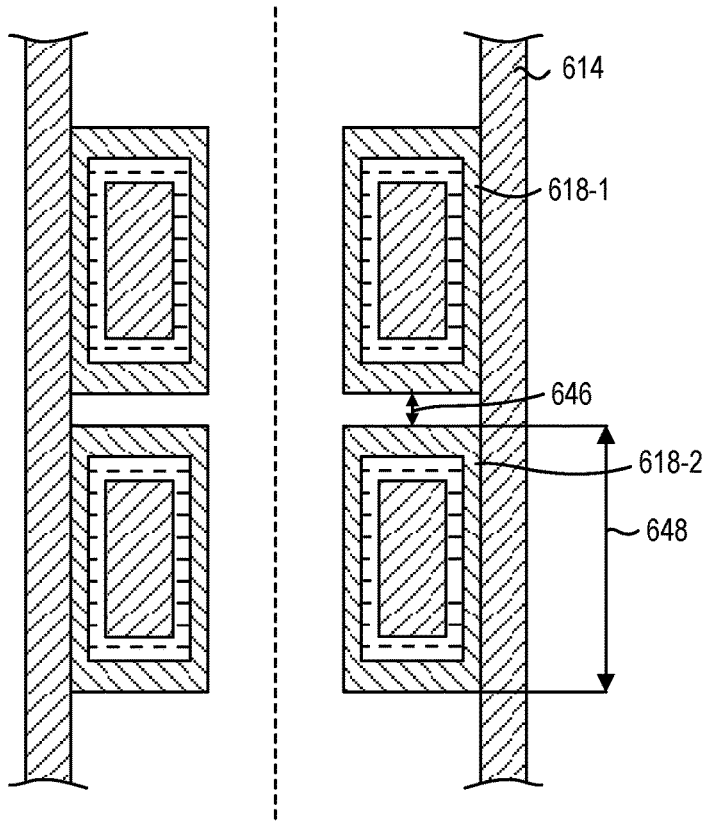
Figure 7:
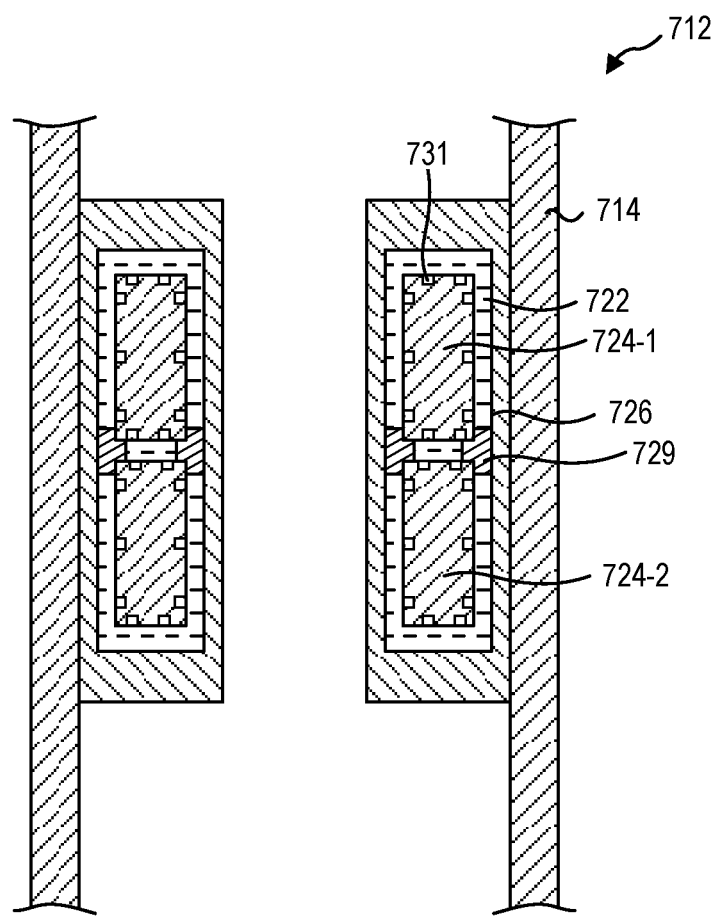

FIG. 7 is a representation of a torsional damping system 712 according to at least one additional embodiment of the present disclosure. In the embodiment shown, a single housing 714 includes a plurality of inertia rings 724-1, 724-2 (collectively 724). The housing 714 includes an interior space 722. A plurality of inertia rings 724 may be installed in the interior space 722. For example, the first inertia ring 724-1 may be located longitudinally uphole of the second inertia ring 724-2 inside the interior space 722. A torsion fluid 726 may be located in the interior space 722 between the housing 714 and the inertia rings 724. In some embodiments, the torsion fluid 726 may be located between the first inertia ring 724-1 and the second inertia ring 724-2. Optionally, one or more spacers 729 may be used to separate the first and second inertia rings 724-1, 724-2. Including a plurality of inertia rings 724 in a single housing 714 may simplify the torsional damping system 712, which may simplify installation and maintenance. Of course, there may also be multiple interior spaces 722 defined by a single housing 714, and each interior space 722 may include one or more inertia rings 724.

In some embodiments, the first inertia ring 724-1 and the second inertia ring 724-2 may rotate independently relative to each other, with a different rotational rate or direction. The first inertia ring 724-1 and the second inertia ring 724-2 may have the same or different mass, shape/construction, or the like. For example, the first inertia ring 724-1 may be larger than the second inertia ring 724-2 or include a more dense material. In some examples, the first inertia ring 724-1 may be smaller than the second inertia ring 724-2 or include a less dense material.

In some embodiments, the inertia rings 724 may include one or more slots or channels 731 on the surfaces of the inertia rings 724-1, 724-2. These slots or channels may facilitate movement of the torsion fluid 726 throughout the space between the housing 714 and the inertia rings 724, and between the first inertia ring 724-1 and the second inertia ring 724-2. Including slots or channels on the inertia rings 724 may further facilitate heat transfer in the torsion fluid 726 and in the inertia rings 724. In some embodiments, a pressure differential may exist between portions of the interior space 722. Slots or channels 731 in the inertia rings 724 or spacers 729 may facilitate pressure compensation throughout the interior space 722.

Figures 1, 8:
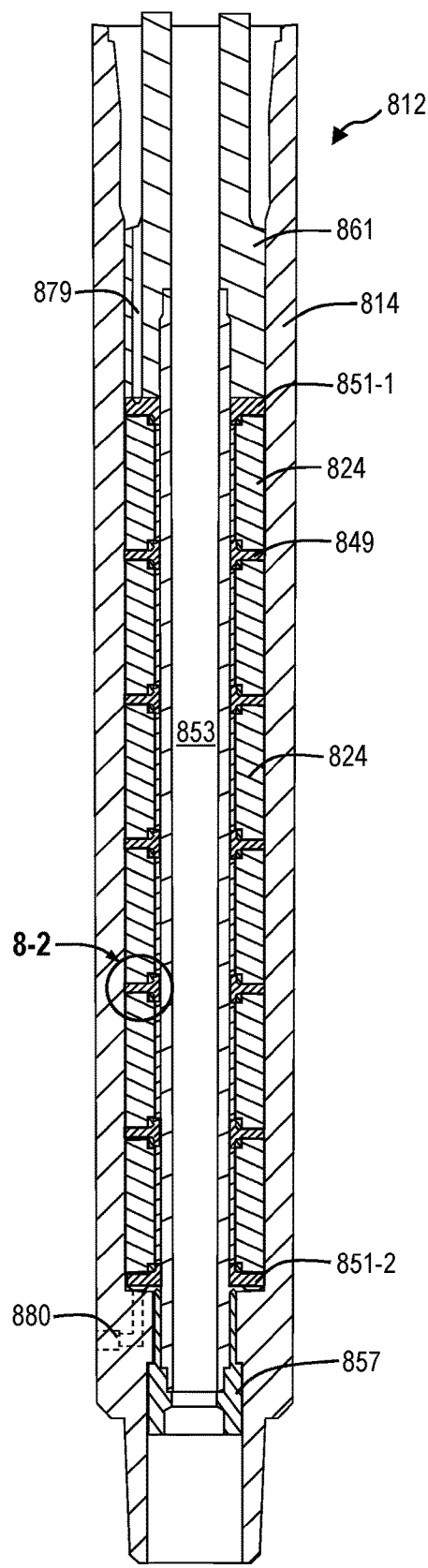
Figures 2, 8:
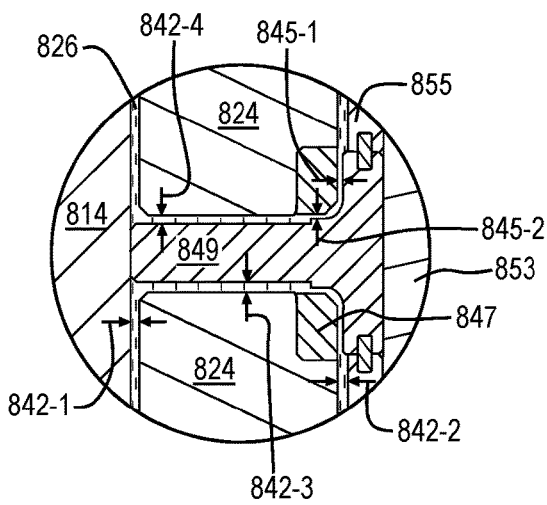
Figures 3, 8:
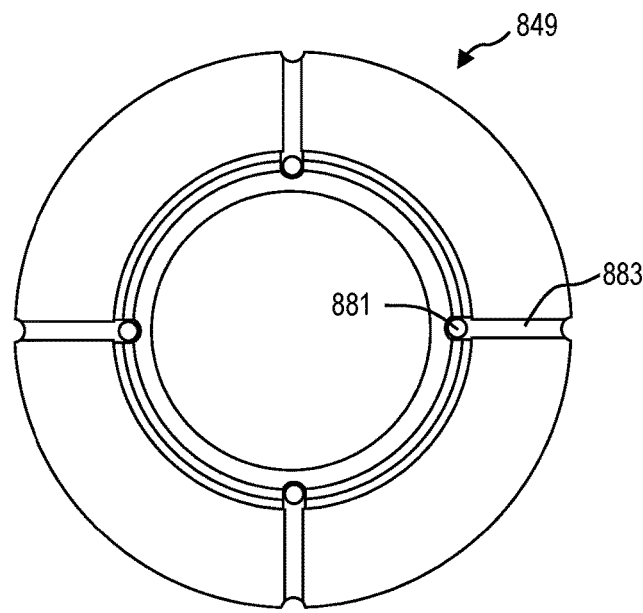

FIG. 8-1 is a cross-sectional view of another torsional damping system 812 according to at least one additional embodiment of the present disclosure. In the embodiment shown, the torsional damping system 812 includes a collar 814 and six inertia elements 824, which are optionally formed as rings as discussed herein. The number of inertia elements 824 is merely illustrative, and may include more or fewer than six inertia elements 824.

The torsional damping system 812 is conceptually similar to the torsional damping system 712 schematically shown in FIG. 7 in that multiple inertia elements 824 are included within a housing, but additional features and various alternative aspects are also shown. For instance, rather than using a single, integral element for a housing of the multiple inertia elements 824, the housing may be formed by multiple components that collectively define an interior space for the torsion fluid and the inertia elements 824. In particular, in this embodiment, an interior space is defined radially between an inner shaft or mandrel 853 and the inner surface of the collar 814.

The interior space depicted in FIG. 8-1 also extends axially between a locking element 857 and a fluid filling fixture 861. The example locking element 857 may a locking nut or other element that can couple the mandrel 853 or other portions of a housing to the collar 814. For instance, the locking element 857 may couple to the mandrel 853 and load the inner assembly—including the mandrel 853 and inertia elements 824—onto a shoulder of the outer collar 814.

An optional fluid filling fixture 861 can define the upper end of the interior space in FIG. 8-1, and can also be used for filling the interior space with torsion fluid 826 (see FIG. 8-2). This may be done with one or more fluid ports 879. Additionally, or alternatively, one or more other ports may be used. For instance, one or more ports 880 in the collar 814 may be used to assist in filling or removing torsion fluid 826.

The torsion fluid 826 contained in the interior space within the housing (or in this embodiment, the inner assembly that with the collar 814 defines a housing) may be separated from other fluid within the torsional damping system 812. For instance, drilling fluid may flow through the bore in the mandrel 853 for delivery to a drill bit or other downhole tool, while the torsion fluid 826 (which is optionally different than the drilling fluid) is contained in the space around the inertia elements 824. One or more plugs, valves, or the like may be used in the ports 879, 880 to maintain separation between the inertia fluid 826, drilling fluid, production fluids, or other fluids.

The plurality of inertia elements 824 positioned in the annular space between the mandrel 853 and the collar 814, and may rotate within the housing and collar 814. In particular, and as discussed herein, as the collar 814 rotates and oscillates, torsion fluid 826 (see FIG. 8-2) around the inertia elements 824 may exert frictional, shear forces on the inertia elements to cause rotation of the inertia elements 824. As the collar 814 undergoes various changes to its rotational speed or direction (e.g., during torsional oscillations), the inertia elements 824 may rotate out of sync with the collar 814. Due to the coupling of the mandrel 853 to the collar 814 (e.g., via the between a locking element 857, the fluid filling fixture 861, or both), the mandrel 853 may rotate in sync with the collar 814.

To facilitate rotation of the inertia elements 824, one or more friction reducing elements may be used within the inner assembly and housing of the torsional damping system 812. In FIG. 8-1, for instance, an end bearing 851-1 is positioned axially between the uppermost inertia element 824 and the fluid filling fixture 861. Similarly, another end bearing 851-2 is positioned axially between the lowermost inertia element 824 and the locking element 857.

While a single inertia element 824 may be located within the housing—and in this embodiment between the end bearings 852-1, 851-2—multiple inertia elements 824 are included in some embodiments. In such embodiments, one or more divider bearings 849 are optionally placed axially between adjacent inertia elements 824. The divider bearings 849 can act as thrust bearings, radial bearings, or as both thrust and radial bearings.

FIG. 8-2 provides an enlarged view of an example divider bearing 849 in a position between two inertia elements 824. As shown, the divider bearing 849 has a T-shaped cross-section although other shapes can be used. For instance, end bearings 851-1 and 851-2 of FIG. 8-1 may have an L-shaped cross-section. In FIG. 8-2, the head of the T extends axially along the inner radial surfaces of the adjacent inertia elements 824, while the post of the T extends radially between the collar 814 and the mandrel 853, and along axial ends of the adjacent inertia elements 824 that are separated by the divider bearing 849.

In the illustrated embodiment, a bushing 847 is fitted to the inner surface of each axial end of the inertia element 824, and cooperates with the head of the divider bearing 849 to reduce friction as the inertia element 824 rotates relative to the collar 814, mandrel 852, and divider bearing 849. The bushing 847 may be press-fit, mechanically attached, or otherwise fixed to the inertia element 824. The bushing 847 may be formed of any suitable material, and the bushing 847 and the inertia element 824 may be formed of the same or different materials. For instance, if the inertia element 824 is formed of steel, the bushing may be or include steel, brass, bronze, titanium, tungsten, a composite, an alloy, a polymer, or the like. Of course, the inertia element 824 may be formed of other materials as discussed herein.

A design of the bushing 847 (or the inertia element 824 itself when there is no bushing 847) and the divider bearing 849 may include one or more predefined bearing clearances. Such clearances may define gaps, and can include a radial clearance 845-1 between an inner surface of the bushing 857 (or inner surface of the inertia element 824) and an outer surface of the head of the divider bearing 849. Additionally, or alternatively, an axial clearance 845-2 may be formed between an axial end of the bushing 847 (or axial end of the inertia element 824) and a radially extending surface of the head or post of the divider bearing 849.

In some embodiments, the clearances 845-1, 845-2 (collectively bearing clearance 845) may be in a range having a lower value, an upper value, or lower and upper values including any of 0.0001 in. (2.54 μm), 0.0005 in. (12.7 μm), 0.001 in. (25.4 μm), 0.002 in. (50.8 μm), 0.0025 in. (63.5 μm), 0.003 in. (76.2 μm), 0.004 in. (101.6 μm), 0.005 in. (127.0 μm), 0.006 in. (152.4 μm), 0.007 in. (177.8 μm), 0.008 in. (203.2 μm), 0.009 in. (228.6 μm), 0.010 in. (254.0 μm), 0.050 in. (0.13 cm), 0.10 in. (0.25 cm), 0.25 in. (0.64 cm), or any value therebetween. For example, the bearing clearances 845 may be greater than 0.0001 in. (2.54 μm). In another example, the bearing clearances 845 are less than 0.25 in. (0.64 cm). In yet other examples, the gap 242 may be any value in a range between 0.0001 in. (2.54 μm) and 0.25 in. (0.64 cm), such as between 0.001 in. (25.4 μm) and 0.005 in. (127.0 μm), or between 0.002 in. (50.8 μm) and 0.010 in. (254.0 μm). Additionally, while the radial clearance 845-1 may be the same as the axial clearance 845-2, in other embodiments they may be different. For instance, the radial clearance 845-1 may be more or less than the axial clearance 845-2.

An inertia element 824 may have a width (e.g., measured radially) that is less than the width of the interior space. In FIG. 8-2, the interior space is defined between the collar 814 and the outer surface of a spacer 855 coupled to the outer surface of the mandrel 853. As shown, the spacer 855 is mounted to the divider bearing 849 (e.g., using pins). This may be used to restrict rotation of the spacers 855, and thereby couple rotation of the spacers 855 and divider bearings 849, which may also be rotationally coupled to one or both of the mandrel 853 or the collar 814. In other embodiments, the spacer 855 may be removed or may be integral with the mandrel 853 or divider bearing 849, and the mandrel 853 or the divider bearing 849 may define the interior space.

The reduced width of the inertia element 824 relative to the interior space may allow for various radial gaps 842-1, 842-2 to be formed on the inner and outer surfaces of the inertia elements 824. At the same time, the length of the inertia elements 824 may be less than the length of the interior space between opposing divider bearings 842 (or between a divider bearing 842 and an end bearing 851-1, 851-2 or between other components defining an interior space). In this way, axial gaps 842-3, 842-4 may be formed on the upper and lower ends of the inertia elements 824.

The radial gaps 842-1, 842-2 and axial gaps 842-3, 842-4 collectively define fluid gaps 842 that may be used to define the frequency response of the torsional damping system 812. For instance, by changing the size of the fluid gaps 842, the frequency response can be targeted for different vibration ranges. Moreover, the fluid gaps 842 can provide at least four surfaces over which the torsion fluid 826 can exert frictional/shear forces on each inertia element 824 in order to change the rotational speed or direction of the inertia element 824. Similar to the bearing clearances 845, the fluid gaps 842 can be varied. For instance, the radial gaps 842-1, 842-2 may be equal to, less than, or greater than the axial gaps 842-3, 842-4.

In some embodiments, different inertia elements 824 may provide different frequency responses for different vibration ranges. For instance, an inertia element 824 may have a different shape, size, or material, or different fluid gaps 842 or bearing clearances 845 than another inertia element 824 within the same torsional damping system 812—or even within the same housing. Moreover, the fluid gaps 842 and the bearing clearances 845 may not only be different, but may be different so that either or both may be changed to suit a customized set of frequency or vibration ranges. Different configurations may be arranged in any suitable manner. For instance, a dampening stage (e.g., inertia elements 824 and corresponding bearing clearance and fluid gap configuration) at one or both axial ends of the torsional damping system 812 may be different than one or each dampening stage between the end stages. In other embodiments, stages may alternate configurations. Of course, other configurations are possible, including as described herein with respect to FIGS. 3-1 and 3-2 to target expected oscillation profiles at different locations. The various changes to inertia element and bearing materials, fluid gaps, bearing gaps, torsion fluid composition, and the like can allow the torsional dampening device to be tuned for specific oscillation profiles, downhole conditions, and operations The bearings (including divider bearings 849 and end bearings 851-1, 851-2), can also have any number of other features or configurations. FIG. 8-3, for instance, is an end view of an example divider bearing 849 that is configured to allow torsion fluid 826 to flow between different stages, and optionally to push out trapped air. In particular, the divider bearing 849 includes one or more openings 881 that allow torsion fluid 826 or air to flow from the space around one inertia element 824, through the divider bearing 849, and into the space around an adjacent inertia element 824. Optionally, channels 883 in one or more axial or radial surfaces of the divider bearing 849 may also facilitate fluid flow between stages. This may facilitate, for instance, filling the interior chamber using a fluid filling fixture 861 or collar port 880, so that the torsion fluid 826 may flow along a full interior chamber within the housing of the torsional damping system 812.

In other embodiments, each stage may be separated and self-contained so that fluid is contained around one inertia element 824 and does not flow to the space around another inertia element 824. This may allow, for instance, different torsion fluids 826 to be used in different stages to target different vibration frequencies.

Although FIGS. 8-2 and 8-3 shows a divider bearing 849, one skilled in the art should appreciate that end bearings 851-1, 851-2 can be similarly configured. For instance, end bearings 851-1 and 851-2 can include bearing clearances, fluid gaps, and the like to allow rotation of the inertia element 824 while providing a desired frequency response. Similarly, openings, channels, or other fluid flow passages may be provided to allow fluid flow within a single dampener stage, or between different stages.

Figures 1, 9:
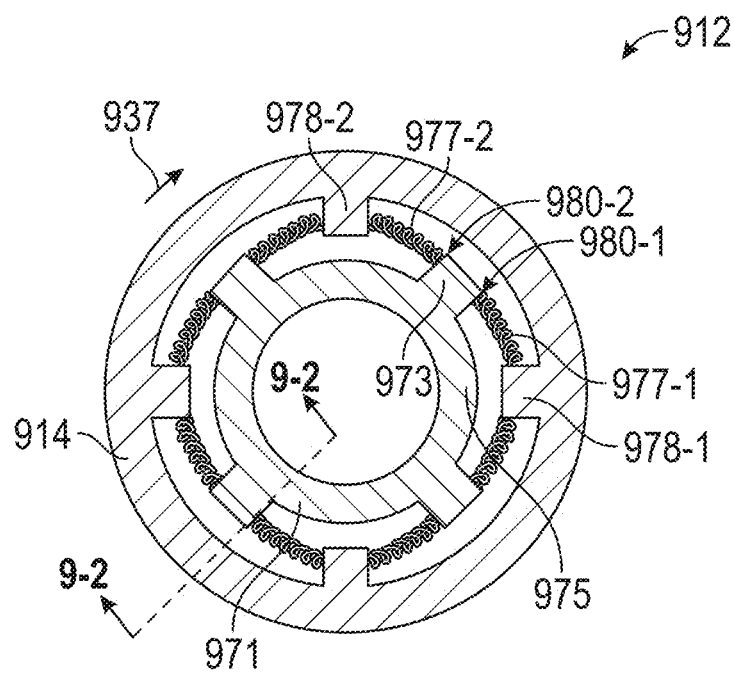
Figures 2, 9:
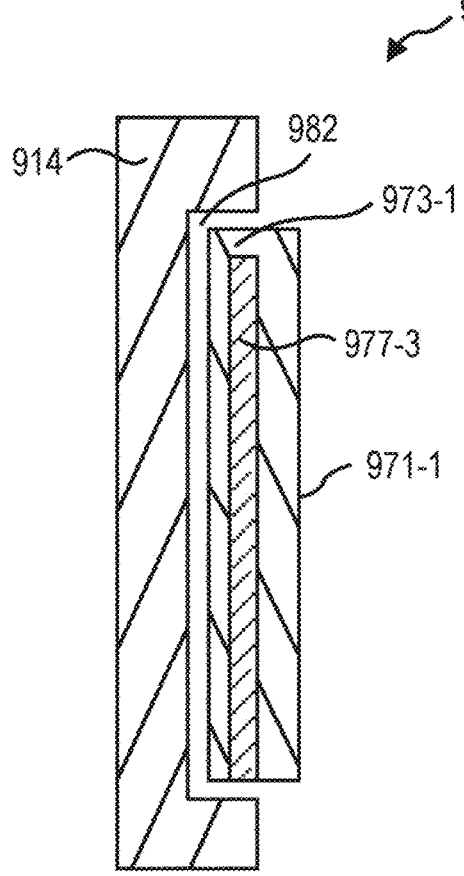
Figures 3, 9:
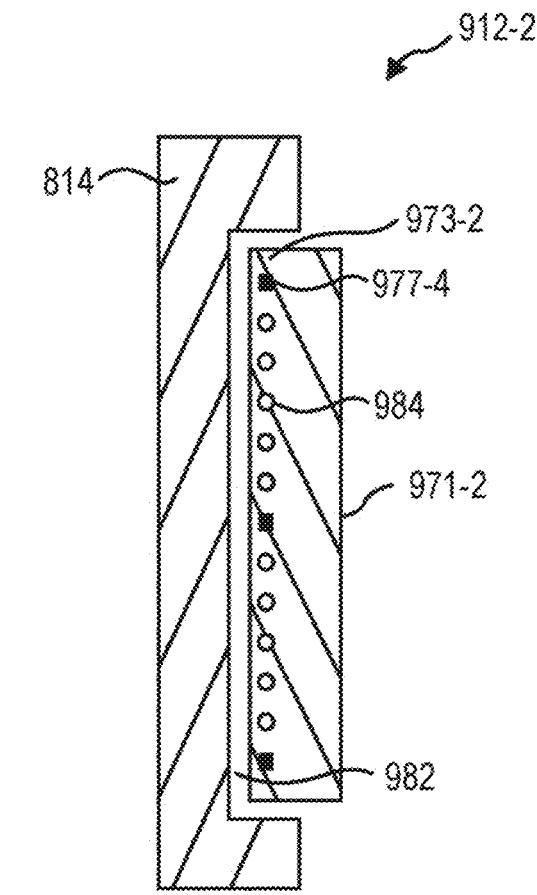

FIG. 9-1 is a representation of a transverse cross-sectional view of a torsional damping system 912, according to at least one additional embodiment of the present disclosure. The torsional damping system 912 includes a housing 914 having one or more housing extensions 978-1, 978-2 (collectively housing extensions 978). A torsion shaft 971 is located inside the housing 914. The torsion shaft 971 is rotatable relative to the housing 914. The torsion shaft 971 includes one or more damping members 973. The torsion damping members 973 may extend (e.g., protrude) from a central shaft 975 of the torsion shaft 971. In the embodiment shown, the torsion shaft 971 includes four torsion damping members 973. However, it should be understood that the torsion shaft 971 may include more or fewer than four torsion damping member 973. For example, the torsion shaft 971 may include one, two, three, four, five, six, seven, eight, nine, ten, or more torsion damping members 973. Additionally, the torsion members 973 may be spaced at equal or unequal angular intervals around the circumference of the torsion shaft 971.

A resilient member 977-1, 977-2 (collectively 977) extends between adjacent housing extensions 978 and the torsion damping members 973. In some embodiments, a first resilient member 977-1 may extend from a first side 980-1 of the torsion damping member 973 to a first housing extension 978-1 and a second resilient member 977-2 may extend from a second side 980-2 of the damping member 973 to a second housing extension 978-2. In some embodiments, the torsional damping system 912 may include a single resilient member 977 connected to the torsion damping member 973 (or multiple resilient members 977 coupled to a single side of the damping member 973). In some embodiments, the resilient members 977 may cause the torsion damping member 973 to be biased toward a centered or other defined position between the first housing extension 978-1 and the second housing extension 978-2.

As the torsional damping system 912 experiences torsional oscillations/vibrations, the housing 914 may rotate (e.g., in the first housing direction 937). This may cause the second resilient member 977-2 to compress, and the first resilient member 977-1 to expand. The compression and extension of the resilient members 977 may cause the torsion shaft 971 to rotate in the same direction as the housing 914 (e.g., in the first housing direction 937), and may transfer at least a portion of the energy of the housing 914 to the torsion shaft 971. During oscillation, the housing 914 may change the rotational rate and/or the rotational direction. However, the torsion shaft 971 may continue to rotate in the first housing direction 937 until the opposing forces on the torsion damping member 973 cause the torsion shaft 971 to stop rotating and/or rotate in the opposite direction. This movement may transfer at least a portion of the energy of the torsion shaft 971 to the housing 914. In this manner, extension and contraction of the resilient members 977 may reduce the energy of the housing 914, thereby damping the magnitude and/or frequency of the oscillations.

In some embodiments, the resilient members 977 may be any resilient or biasing member. For example, the resilient members 977 may be made from one or more springs, such as coil springs, wave springs, leaf springs, Belville springs, and the like. In some examples, the resilient members 977 may be made from an elastically deformable and/or compressible material, such as rubber, silicone, plastic, and the like. In some examples, the resilient members 977 may be made from a combination of springs and elastically deformable/compressible materials.

FIG. 9-2 is a representation of a longitudinal cross-sectional view of the torsional damping system 912 of FIG. 9-1 along A-A'. The depicted torsional damping system 912-1 includes a housing 914 that defines a torsion cavity 982 (e.g., the space between the first housing extension 978-1 and the second housing extension 978-2 in FIG. 9-1). The torsion damping member 973-1 extends into the torsion cavity 982. The resilient member 977-1 is connected to the torsion damping member 973 along the longitudinal length of the torsion damping member 973. In some embodiments, the resilient member 977-1 extends along the entirety of the longitudinal length of the torsion damping member 973-1. In some embodiments, the resilient member extends along an extension percentage of the torsion damping member 973-1. In some embodiments, the extension percentage may be in a range having a lower value, an upper value, or lower and upper values including any of 10%, 20%, 30%, 40%, 50%, 60%, 70%, 80%, 90% 100%, or any value therebetween. For example, the extension percentage may be greater than 10%. In another example, the extension percentage may be less than 100%. In yet other examples, the extension percentage may be any value in a range between 10% and 100%. In the embodiment shown in FIG. 9-2, the resilient member 977-1 is made from an elastically deformable block of material, such as rubber or silicone. However, the resilient member 977-1 may be made from a wave spring, a leaf spring, or any other resilient or biasing member.

FIG. 9-3 is a representation of another longitudinal cross-sectional view of another embodiment of a torsional damping system 912-2 taken along A-A' of FIG. 9-1. In the embodiment shown, the torsion damping member 973-2 includes a plurality of resilient members 977-4 along the illustrated height of the torsion damping member 973-2. In the embodiment shown, the torsion damping member 973-2 includes three resilient members 977-4; however, it should be understood that the torsion damping member 973-2 may include more or less than three resilient members 977-4. For example, the torsion damping member 977-4 may include one, two, three, four, five, six, seven, eight, nine, ten, or more resilient members longitudinally aligned or otherwise positioned along the torsion damping member 973-2.

In the embodiment shown, the torsion damping member 973-2 includes a plurality of torsion fluid pathways 984. The torsion fluid pathways 984 include, in this embodiment, small holes or openings through which a torsion fluid in the cavity 982 may travel. Torsion fluid traveling through the torsion fluid pathways 984 may change the inertial properties of the torsion damping member 973. For example, a larger number of torsion fluid pathways 984 may decrease the resistance to rotation of the torsion damping member 973. A smaller number of torsion fluid pathways 984 may increase the resistance to rotation of the torsion damping member 973. The torsion fluid pathways 984 can include through holes or blind holes, or may include slots or channels in a surface of the torsion shaft 971

Figures 1, 10:
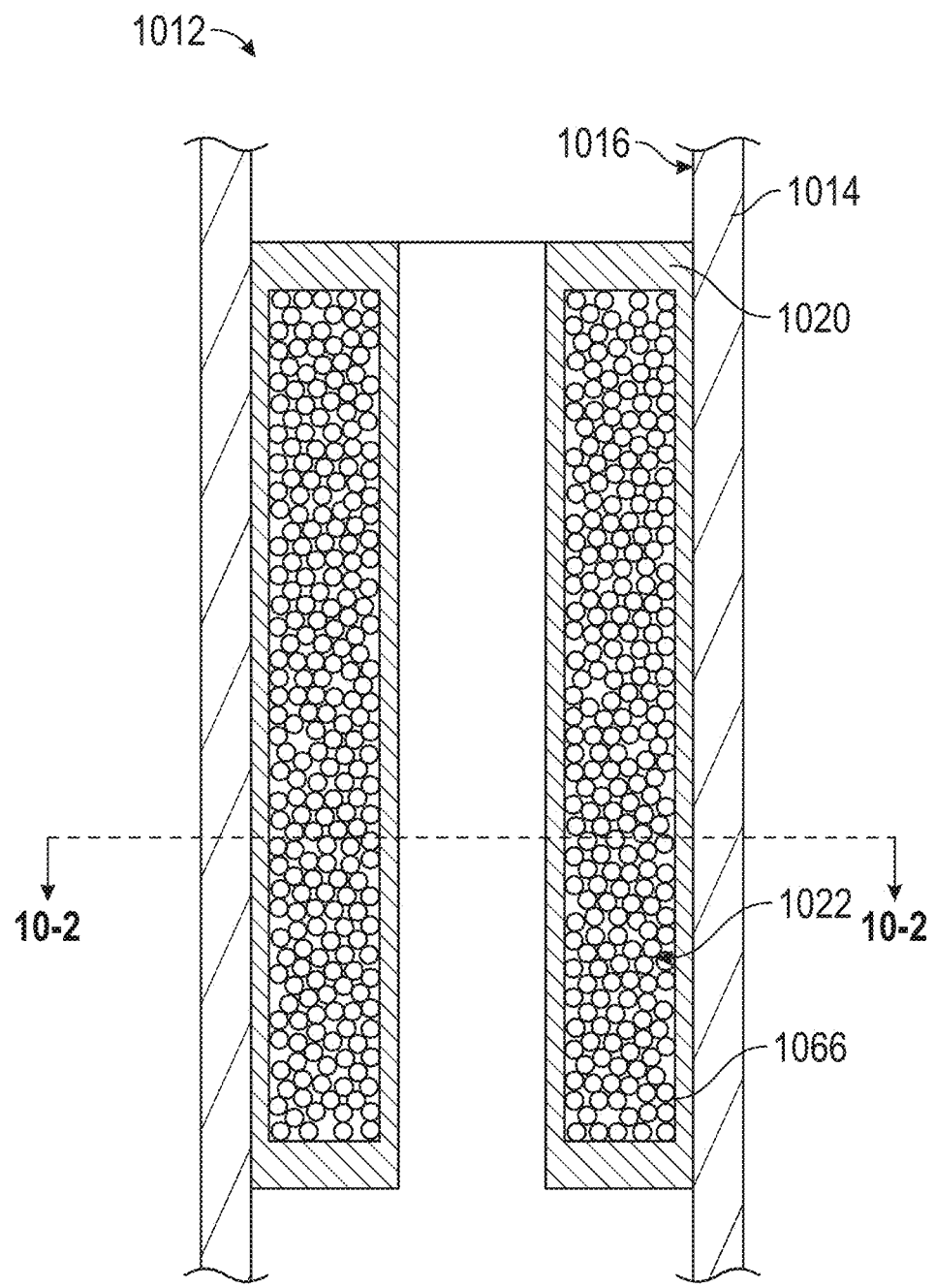
Figures 2, 10:
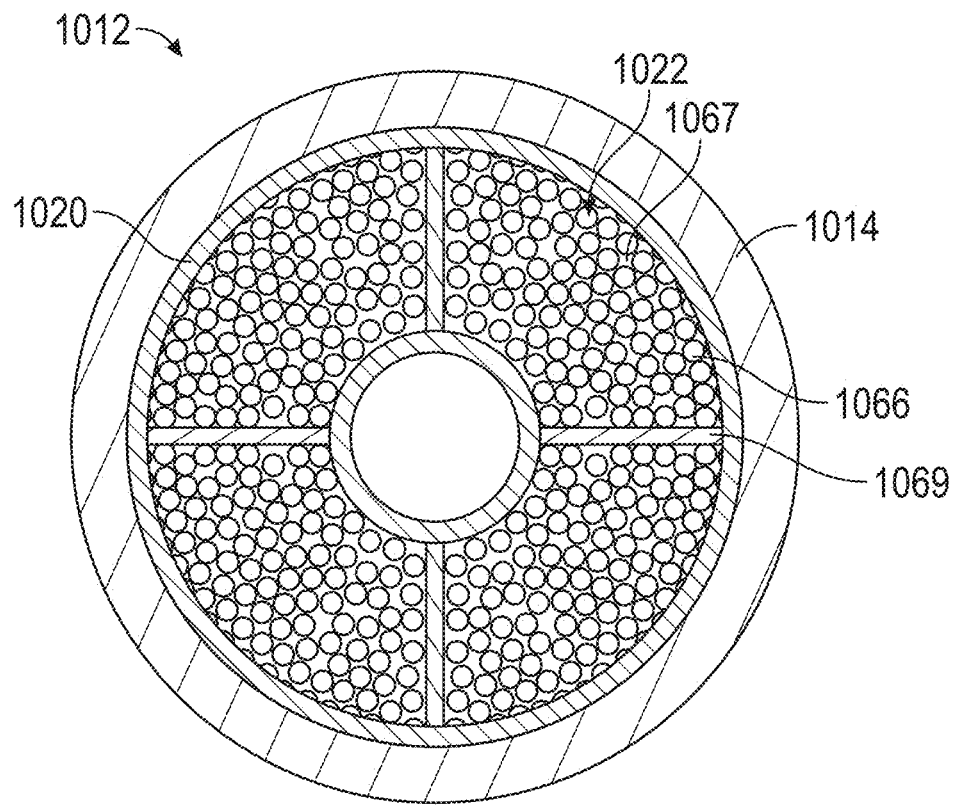

FIG. 10-1 is a representation of a torsional damping system 1012, according to at least one additional embodiment of the present disclosure. The torsional damping system 1012 shown includes a housing 1020 coupled to the inner surface 1016 of a collar 1014. Although the housing 1020 is shown as extending along the inner surface 1016, in some embodiments, the collar 1014 may itself define a housing for the torsional damping system, as described herein with reference to FIGS. 8-1 and 8-2.

In some embodiments, an interior space 1022 of the housing 1020 may be partially or fully filled with a granular material, such as a plurality of inertia beads 1066. As the collar 1014 or the housing 1020 rotates in a first direction, the inertia beads 1066 in the interior space 1022 may be caused to rotate in the first direction. When the collar 1014 or the housing 1020 oscillate and rotate in a second direction (or at a different rate in the first direction), some or all of the inertia beads 1066 may continue to rotate in the first direction (or at a first rate). Furthermore, the inertia beads 1066 may include move uphole and downhole in response to axial vibrations in the collar 1014. In some embodiments, the inertia beads 1066 may not move in concert (e.g., at the same time, with the same velocity). Individual inertia beads 1066 may impact, contact, bump, and jostle each other. The impact and friction between individual inertia beads 1066 with each other may dissipate energy from torsional oscillations and axial or lateral vibrations. This energy dissipation may reduce the amplitude or the frequency of the oscillations of the collar 1014.

In some embodiments, the inertia beads 1066 may be fabricated from a metal alloy, including tungsten alloys, steel alloys, aluminum alloys, lead, any other metal, ceramics, carbides, sand (e.g., silica or quartz sand), other non-metal materials, or combinations thereof.

A fluid (gas or liquid) 1067 may fully or partially fill the space 1022 between the inertia beads 1066. In some embodiments, a gas such as atmospheric air fully or partially fills the space 1022 between the inertia beads 1066. In some embodiments, a liquid such as a torsion fluid, water, oil, drilling mud, or other fluid fully or partially fills the space 1022 between the inertia beads 1066. The liquid may be a Newtonian fluid or a non-Newtonian fluid. In some embodiments, the liquid may partially fill the space 1022 between the inertia beads 1066, and a gas or a different liquid may fill the remainder of the space 1022 between the inertia beads 1066. The material filling the space 1022 between the inertia beads 1066 may help to determine the damping effect of the inertia beads 1066. For example, a less dense fluid (gas or liquid) between the inertia beads 1066 may result in a larger damping effect, and a denser fluid between the inertia beads 1066 may result in a smaller damping effect.

FIG. 10-2 is a cross-sectional view of the torsional damping system 1012 of FIG. 10-1 along the line 10-2-10-2 of FIG. 10-1. In some embodiments, the interior space 1022 of the housing may include one or more chambers 1069. The chambers may include one or more radial or axial features, including walls or baffles 1069. The inertia beads 1066 may engage or contact the radial or axial walls, which may help to further damp rotational oscillations and/or vibrations. In some embodiments, the walls 1069 may be longitudinal (e.g., extend in a direction parallel to the longitudinal axis). Longitudinal walls 1069 may help to damp rotational vibrations and oscillations. In some embodiments, the walls 1069 may be radial (e.g., extending radially from a central bore to the collar 1014). Radial walls 1069 may help to damp vertical vibrations and oscillations.

Figure 11:
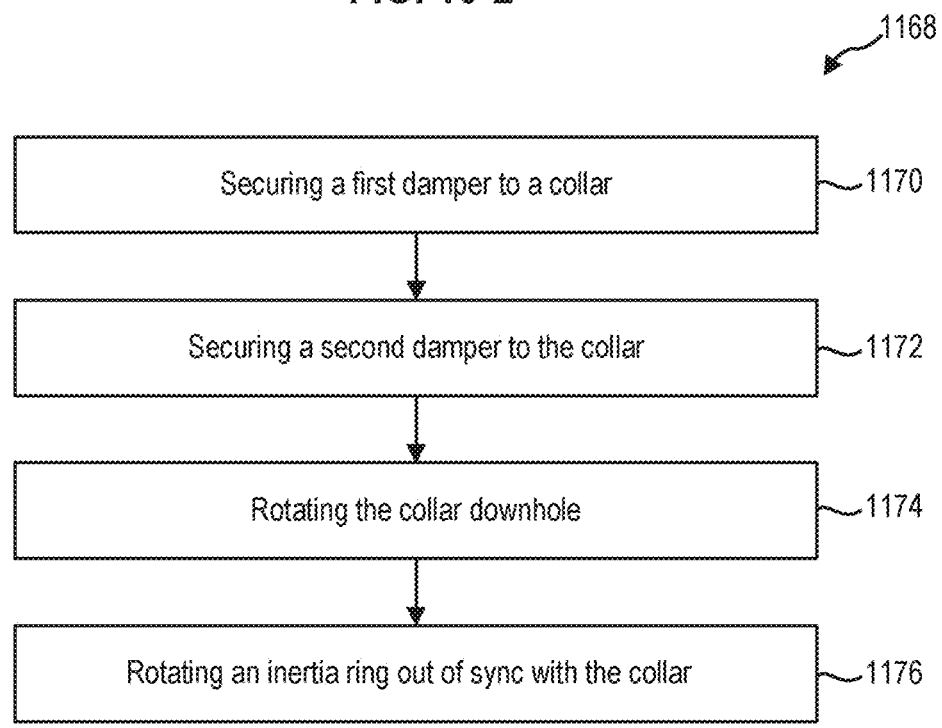
FIG. 11 is a flowchart of a method for damping vibrations, according to at least one embodiment of the present disclosure.

FIG. 11 is a flowchart depicting a method 1168 for damping torsional oscillations. The method 1168 includes coupling a first damper a collar at 1170. As discussed herein, this may include coupling a damper to the collar. In some embodiments, this includes coupling a housing of the damper to the collar so that the housing and collar move in synchronization. The damper may be coupled to an inner or outer surface of the collar, or may be coupled to an uphole or downhole portion of the collar.

A second damper is optionally coupled to the collar at 1172. The second damper may be coupled in the same or a different manner as compared to the first collar. The collar may be rotated in a downhole environment at 1174. In some embodiments, rotating the collar downhole may include or result in vibrations/oscillations of the collar. For example, the collar may oscillate in response to downhole drilling or production activities, such as drilling, generating power with a downhole motor, reaming, fracturing, lifting production fluids, or performing other downhole activities.

In response to rotating the collar, one or more inertia elements of the first or second damper may move at 1176. The inertia elements may be located inside or outside the interior space of a housing of each damper, and may be moved out of sync with the collar. For example, inertia rings may rotate with a different rotational rate or in a different rotational direction than the collar. Similarly, inertia beads may rotate within the housing at a different rotational speed or direction as compared to the oscillating collar. Moving the inertia element(s) in response to the collar rotation may include rotating the inertia elements based on the rotation of the collar. For example, rotating the collar may include transferring a frictional/shear torque or force to a torsion fluid in the interior space of the housing. The torsion fluid may transfer at least a portion of the frictional/shear force to the inertia elements, which may cause the inertia element to rotate.

The inertia elements may rotate or otherwise move out of sync with the collar. This may cause the inertia elements to transfer at least a portion of their energy to the collar or for the collar to transfer at least a portion of its rotational energy to the inertia elements. In this manner, the inertia elements may reduce the rotational energy of the oscillating collar, which may reduce the torsional oscillations of the collar. This may help to reduce damage to downhole components caused by torsional oscillations. In some embodiments, rotating the inertia ring out of sync with the collar is the result of torsional oscillations. For instance, as torsional oscillations (i.e., changes in direction or magnitude of rotation experienced by the collar) occur, the first and/or second damper may not respond at the same time as the corresponding location on the collar, resulting in inertia elements in the first and second dampers rotating at a different speed or direction as compared to the corresponding locations of the collar.

Accordingly, the method 1168 may include moving a first inertia element (e.g., a ring or granular material in a first housing of the first damper) with a first rotational rate or direction. A second inertia element (e.g., a ring or granular material in a second housing of the second damper, or in a second location in the same housing) is moved with a second rotational rate or direction. In some embodiments, the first rotational rate is different than the second rotational rate. In some embodiments, the first rotational direction is different than the second rotational direction. Thus, the method 1168 may include moving the first inertia element at a different rotational rate or direction than the second inertia element (and optionally compared to the collar). This may be due to the placement of the inertia elements at different locations along the length of a BHA (e.g., between the downhole motor and the bit), different structures of the inertia elements, and the like.

In some embodiments, the method 1168 may further include flowing a fluid flow through a central bore in the housing and cooling the plurality of dampers with the fluid flow. Moving the inertia elements inside the housing may cause the housing, the inertia elements, or a torsion fluid to increase temperature, which could damage such components. In some embodiments, heating the torsion fluid may decrease the fluid viscosity and change the torsional damping properties of the dampers. Cooling the plurality of dampers may therefore improve the torsional damping characteristics of the plurality of dampers, or at least improve the consistency of the dampers.

INDUSTRIAL APPLICABILITY

Embodiments of the present disclosure relate to devices, systems, and methods for inertia damping in downhole tools. Downhole systems may include many motions, vibrations, oscillations, and other movements. In some embodiments, the movements may be associated with drilling, remedial, or production activities. For example, a downhole tool may rotate to degrade a formation during a drilling operation. The engagement of the downhole tool with the formation may cause vibrations, torsional oscillations, and other motions. For the purposes of this disclosure, the terms vibrations, oscillations, and other motions may be used interchangeably, unless otherwise stated. Left unchecked, these torsional oscillations may increase wear on the downhole tool, damage the downhole tool, increase fatigue on materials in the downhole tool, and combinations thereof. A damper may be installed on the downhole tool to reduce the effect of the torsional oscillations. For example, a damper may reduce the amplitude and/or frequency of the torsional oscillations.

In some embodiments, the properties and structure of the inertia damping systems discussed above may be combined, changed, and/or modified to optimize an inertia damping system for a particular application. In some embodiments, changing the properties and/or structure of the inertia damping system may widen or narrow the range of magnitude and/or frequency of inertia damping provided by the inertia damping system.

In some embodiments, the material from which the inertia ring is fabricated may be changed to change the magnitude and/or frequency of the torsional oscillation damping. Changing the inertia ring material may include changing the density of the inertia ring, which may change the mass of the inertia ring, thereby changing its oscillation damping properties.

In some embodiments, the torsion fluid may be changed to reduce the magnitude and/or frequency of the torsion oscillation damping. For example, the viscosity of the torsion fluid may be changed to change the resistance to rotation of the inertia ring by the torsion fluid. This may change the frequency and/or magnitude of the inertia damping provided by the inertia ring. In some embodiments, the torsion fluid may be changed to a granular material, such as a plurality of small torsion beads as discussed herein.

In some embodiments, the gap between the inner walls of the housing or collar and the inertia ring may be changed to change the magnitude and/or frequency of the inertia damping system. This may include increasing the gap, decreasing the gap, and adding variations in the gap (such as by modifying the texture and/or profile of the surface of the inner wall of the housing).

In some embodiments, an inertia damping system may allow for different mechanisms of oscillation damping at different locations of oscillation. For example, the material and/or the dimensions of an inertia ring may be changed either along the length of the inertia ring, or different inertia rings within the same housing or in different dampers may have different materials and/or dimensions. This may help to change the range of the magnitude and/or frequency bandwidth of the damped oscillations.

In some embodiments, a damper may be separated and/or segmented to have one or more inertia rings at any or each location of oscillation. In some embodiments, an inertia ring may be split within the same interior space of a housing to allow for independent rotation of the inertia rings within the housing. In some embodiments, the properties of the separated and/or segmented dampers and/or inertia rings may be different. For example, a first inertia ring may be made from a first material, and a second inertia ring may be made from a second material. In another example, a first inertia dampener may be used with a torsion fluid of a first type, while another inertia dampener uses a torsion fluid of a different type. Other variations may also be made, including fluid frictional/shear gaps around a torsion ring, bearing clearances, torsion ring shapes, and the like. These options may allow the inertia damping system to provide differing magnitudes and/or frequencies (or magnitude and frequency ranges) of damping based on oscillation profile of a downhole tool. In this manner, the downhole drilling system may experience reduced oscillation and/or vibrations along a length of the downhole drilling system (or its entirety). In some cases, differing components can be interchangeable so as to easily change the tool at the surface to be suitable for different conditions expected during separate operations.

In some embodiments, separating and/or segmenting damping systems and/or inertia rings may allow for differing levels of rigidity of a downhole tool. For example, a downhole tool may need to bend to complete a dogleg, such as through directional drilling, using a whipstock, or other dogleg mechanism. By segmenting the dampers and/or inertia rings into multiple pieces, the bendability of the inertia damping system may be matched to the flexibility of the downhole drilling system.

The embodiments of the torsional oscillation system have been primarily described with reference to wellbore drilling operations; however, the torsional oscillation systems described herein may be used in applications other than the drilling of a wellbore, including in producing or remediating a wellbore. In other embodiments, torsional oscillation systems according to the present disclosure may be used outside a wellbore or other downhole environment used for the exploration or production of natural resources. For instance, torsional oscillation systems of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. As used herein, the term "axial" refers to directions measured along an axis (e.g., a longitudinal axis of a tool), while the term "radial" refers to a direction perpendicular to such an axis (e.g., extending from the longitudinal axis toward an outer housing, collar, etc.).

Various features are described herein in alternative format in order to emphasize that features may be combined in any number of combinations. Each feature should be considered to be combinable with each other feature unless such features are mutually exclusive. The term "or" as used herein is not exclusive unless the contrary is clearly expressed. For instance, having A or B encompasses A alone, B alone, or the combination of A and B. In contrast, having only A or B encompasses A alone or B alone, but not the combination of A or B. Even if not expressly recited in multiple independent form, the claims should be considered combinable with each other claim (or any combination of other claims).

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A downhole inertia damping system, comprising:
   a collar positioned axially between a downhole tool and a bit; and
   a damper coupled to the collar, the damper comprising:
      a mandrel disposed in the collar, the mandrel and the collar defining an internal chamber therebetween;
      a first inertia ring disposed around the mandrel inside the internal chamber, the first inertia ring being rotatable within the internal chamber and relative to the collar;
      a second inertia ring disposed around the mandrel inside the internal chamber, the second inertia ring being rotatable within the internal chamber and relative to the collar;
      a bearing element disposed around the mandrel in the internal chamber and extending between the mandrel and the collar to separate the first inertia ring from the second inertia ring;
      a bushing disposed on the first inertia ring or the second inertia ring, the bushing configured to contact the bearing element; and
      a torsion fluid contained within the internal chamber and in contact with the first inertia ring, and in contact with the second inertia ring via a plurality of openings in the bearing element.

2. The downhole inertia damping system of claim 1, the damper being located closer to the downhole tool than to the bit.

3. The downhole inertia damping system of claim 1, wherein the mandrel comprises an outer surface and an inner surface, the inner surface defining a bore.

4. The downhole inertia damping system of claim 3, wherein the bearing element is engaged with an inner surface of the collar and the outer surface of the mandrel.

5. The downhole inertia damping system of claim 3, the damper further comprising a spacer coupled to the mandrel.

6. The downhole inertia damping system of claim 5, wherein the bearing element is attached to the spacer.

7. The downhole inertia damping system of claim 1, the bearing element further including a surface defining a plurality of channels, the surface facing one of the first inertia ring or the second inertia ring.

8. A method for damping oscillations, comprising:
   rotating a collar downhole that is connected to a damper and positioned axially between a downhole tool and a bit, the damper comprising:
      a mandrel disposed in the collar, the mandrel including a first surface, and the first surface and the collar defining an internal chamber therebetween;
      a first inertia ring disposed around the mandrel inside the internal chamber, the first inertia ring being rotatable within the internal chamber and relative to the collar;
      a second inertia ring disposed around the mandrel inside the internal chamber, the second inertia ring being rotatable within the internal chamber and relative to the collar;
      a bearing element disposed around the mandrel in the internal chamber, and extending between the mandrel and the collar to separate the first inertia ring from the second inertia ring;
      a bushing disposed on the first inertia ring or the second inertia ring, the bushing configured to contact the bearing element; and
      a torsion fluid contained within the internal chamber and in contact with the first inertia ring, and in contact with the second inertia ring via a plurality of openings in the bearing element; and
   in response to rotating the collar, rotating the first inertia ring and the second inertia ring out of sync with the rotation of the collar.

9. The method of claim 8, further comprising:
   rotating the first inertia ring at a first rotational rate; and
   rotating the second inertia ring at a second rotational rate, the second rotational rate being different than the first rotational rate.

10. The method of claim 8, further comprising:
   flowing a drilling fluid through a central bore in the mandrel defined by a second surface of the mandrel, the drilling fluid being separated from the internal chamber by a wall of the mandrel.

* * * * *